US009066493B2

(12) United States Patent
Barzani

(10) Patent No.: US 9,066,493 B2
(45) Date of Patent: Jun. 30, 2015

(54) ANIMAL CONTAINMENT FENCE AND METHOD OF ASSEMBLING ANIMAL CONTAINMENT FENCE

(71) Applicant: Mustafa Barzani, Washington, DC (US)

(72) Inventor: Mustafa Barzani, Washington, DC (US)

(73) Assignee: Golden Eagle Global, Inc., Washington, DC (US)

( * ) Notice: Subject to any disclaimer, the term of this patent is extended or adjusted under 35 U.S.C. 154(b) by 26 days.

(21) Appl. No.: 13/622,095

(22) Filed: Sep. 18, 2012

(65) Prior Publication Data

US 2014/0076243 A1    Mar. 20, 2014

(51) Int. Cl.
| | | |
|---|---|---|
| A01K 3/00 | (2006.01) | |
| A01K 15/02 | (2006.01) | |
| A63K 3/04 | (2006.01) | |
| E04H 17/14 | (2006.01) | |

(52) U.S. Cl.
CPC .................. *A01K 3/00* (2013.01); *A01K 15/027* (2013.01); *A63K 3/046* (2013.01); *E04H 2017/1478* (2013.01)

(58) Field of Classification Search
CPC ........ A01K 15/027; A01K 3/00; A63K 3/046
USPC .............. 256/24, 59; 119/416, 502, 512, 513, 119/519, 522, 705
IPC .................................. E04H 17/12, 17/14, 17/16
See application file for complete search history.

(56) References Cited

U.S. PATENT DOCUMENTS

| | | | |
|---|---|---|---|
| 1,985,322 A | 6/1933 | La Clair | |
| 2,150,651 A | 3/1939 | Ewing | |
| 3,787,033 A | 1/1974 | Snyder et al. | |
| 3,921,960 A | 11/1975 | Bright | |
| 3,933,311 A | 1/1976 | Lemelson | |
| 4,148,277 A * | 4/1979 | Engle et al. | .................... 119/502 |
| 4,477,059 A | 10/1984 | Willis | |
| 5,230,500 A * | 7/1993 | Lin | ................................. 256/67 |

(Continued)

FOREIGN PATENT DOCUMENTS

| | | |
|---|---|---|
| DE | 199 23 176 | 12/2000 |
| GB | 974055 | 11/1964 |
| WO | WO 2008/031154 | 3/2008 |

OTHER PUBLICATIONS

The International Search Report and the Written Opinion of the International Searching Authority mailed Dec. 30, 2013, for PCT/US13/53697, ISA/US Alexandria, Virginia.

*Primary Examiner* — Shadi Baniani
(74) *Attorney, Agent, or Firm* — Oliff PLC

(57) ABSTRACT

An animal containment fence includes posts that may be anchored to a surface, connection members that may be transversely coupled to the posts, and flexible cross-members disposed between the posts by telescopically and reciprocally engaging the connection members transversely coupled to the posts. The engagement between the connection members and the cross-member moves reciprocally upon a flexion of the cross-member due to application of a force less than a release force to the cross-member. The engagement between the connection members and the cross-member releases upon a flexion a flexible cross-member due to application of a force equal to or greater than a release force. A method of assembling the animal containment fence includes anchoring posts to a surface, transversely coupling connection members to the posts, and telescopically and reciprocally engaging cross members with the connection members.

15 Claims, 17 Drawing Sheets

(56) References Cited

U.S. PATENT DOCUMENTS

| | | | |
|---|---|---|---|
| 5,312,089 A * | 5/1994 | Venegas, Jr. | 256/65.12 |
| 5,362,030 A | 11/1994 | Iler, Jr. et al. | |
| 5,370,368 A | 12/1994 | Terrels et al. | |
| 6,290,213 B1 | 9/2001 | Laird et al. | |
| 2003/0146426 A1 | 8/2003 | Ray et al. | |
| 2004/0188667 A1 | 9/2004 | Ray et al. | |
| 2006/0255327 A1 | 11/2006 | Johnston | |
| 2009/0044759 A1 | 2/2009 | Lewis | |
| 2009/0278105 A1 * | 11/2009 | McIlwain | 256/65.02 |
| 2010/0044662 A1 * | 2/2010 | Walmsley | 256/24 |
| 2010/0308293 A1 | 12/2010 | Larkins et al. | |

\* cited by examiner

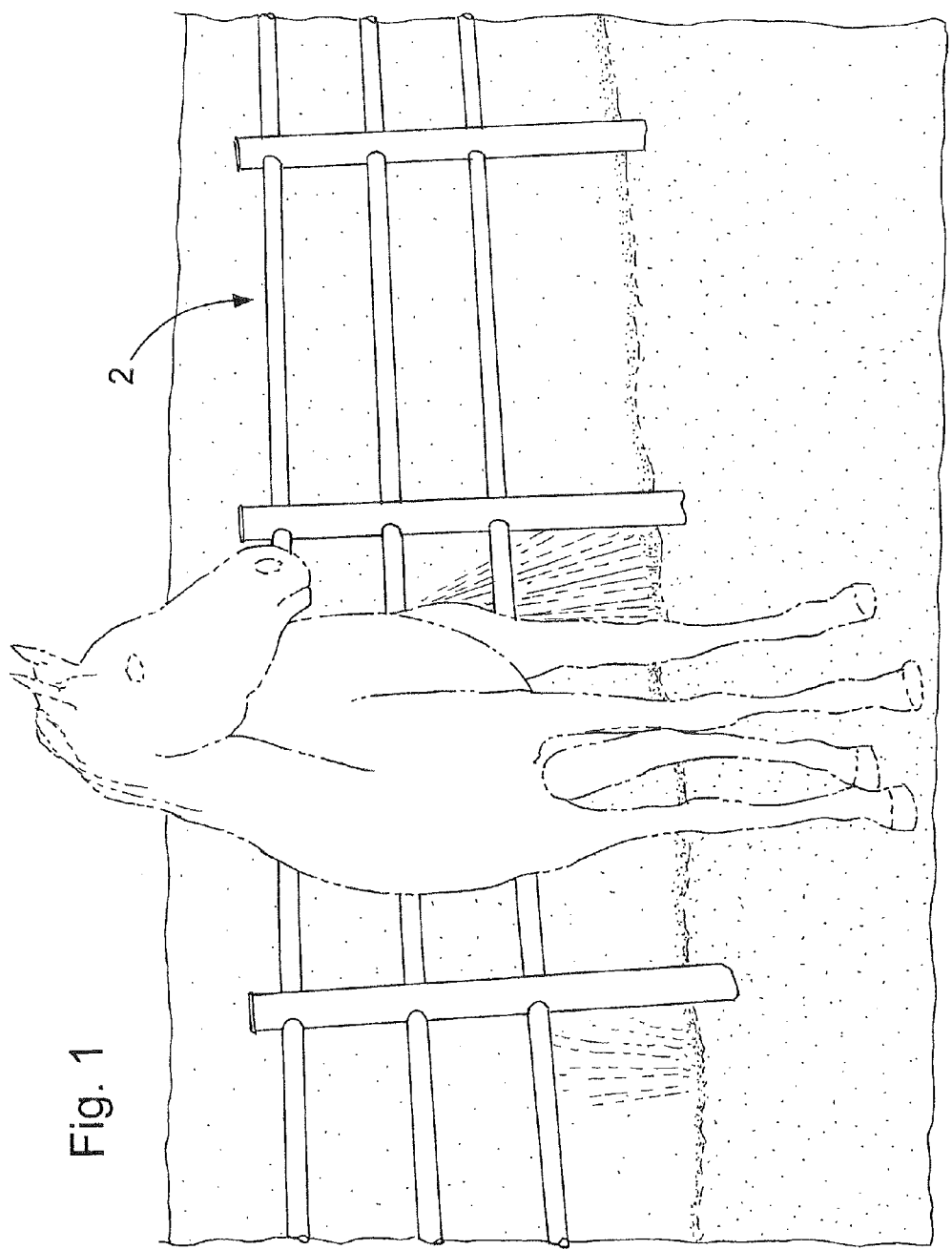

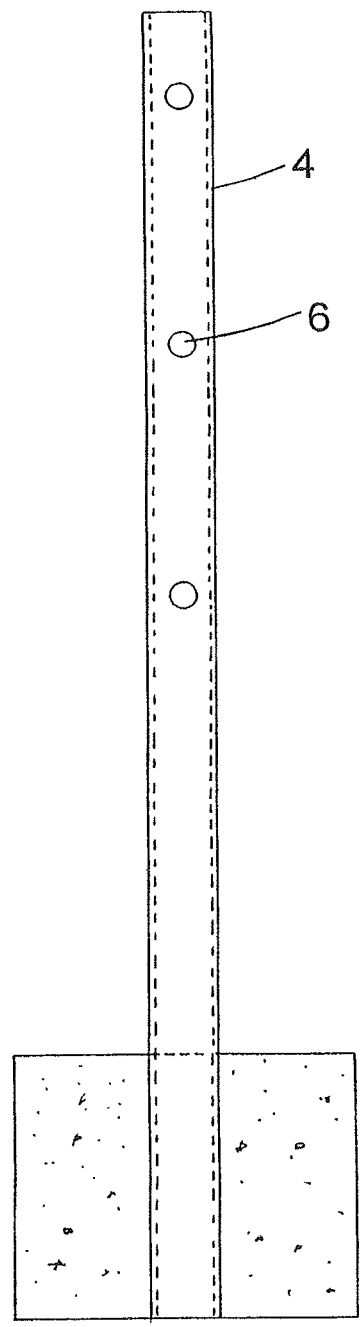

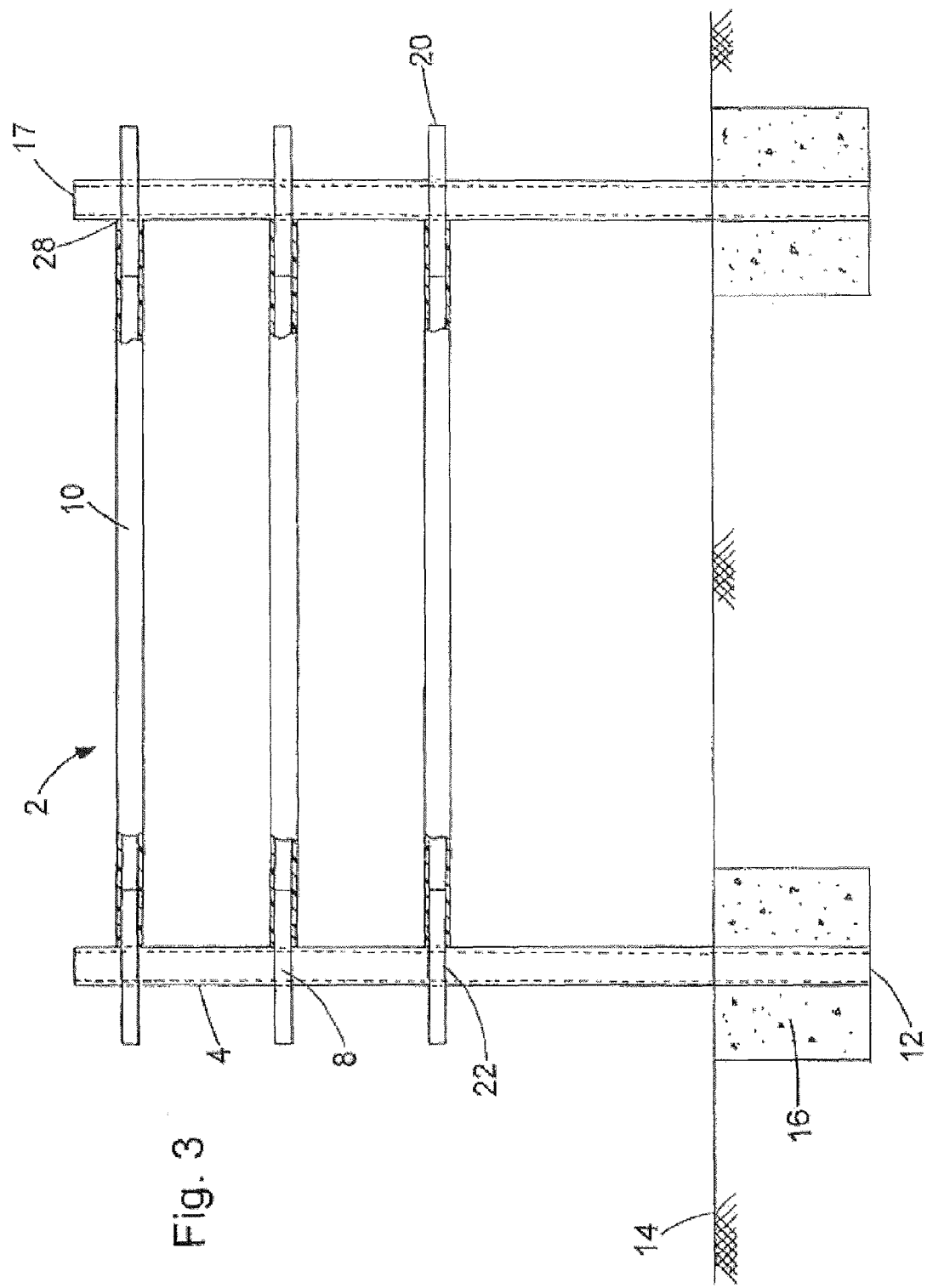

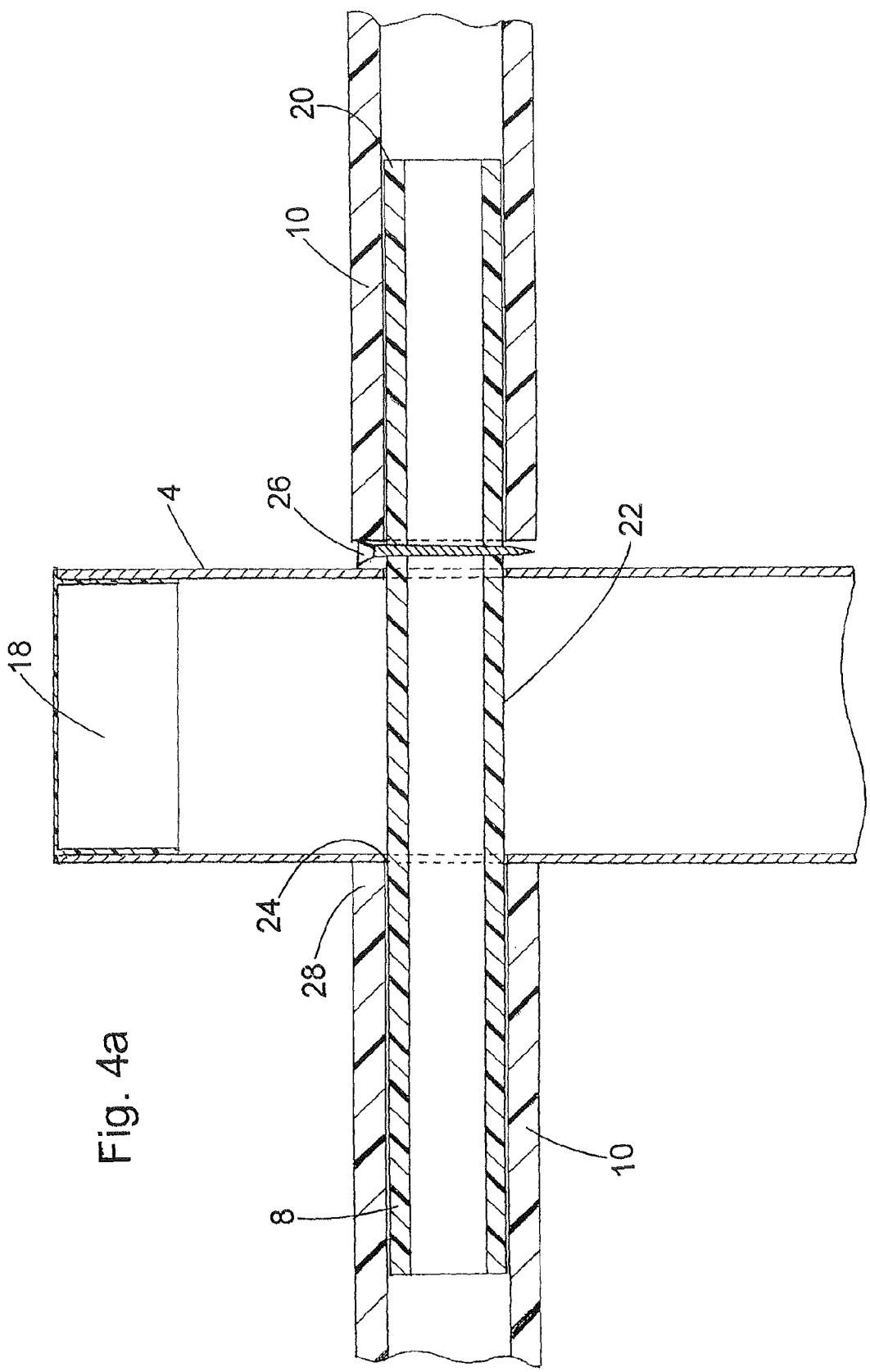

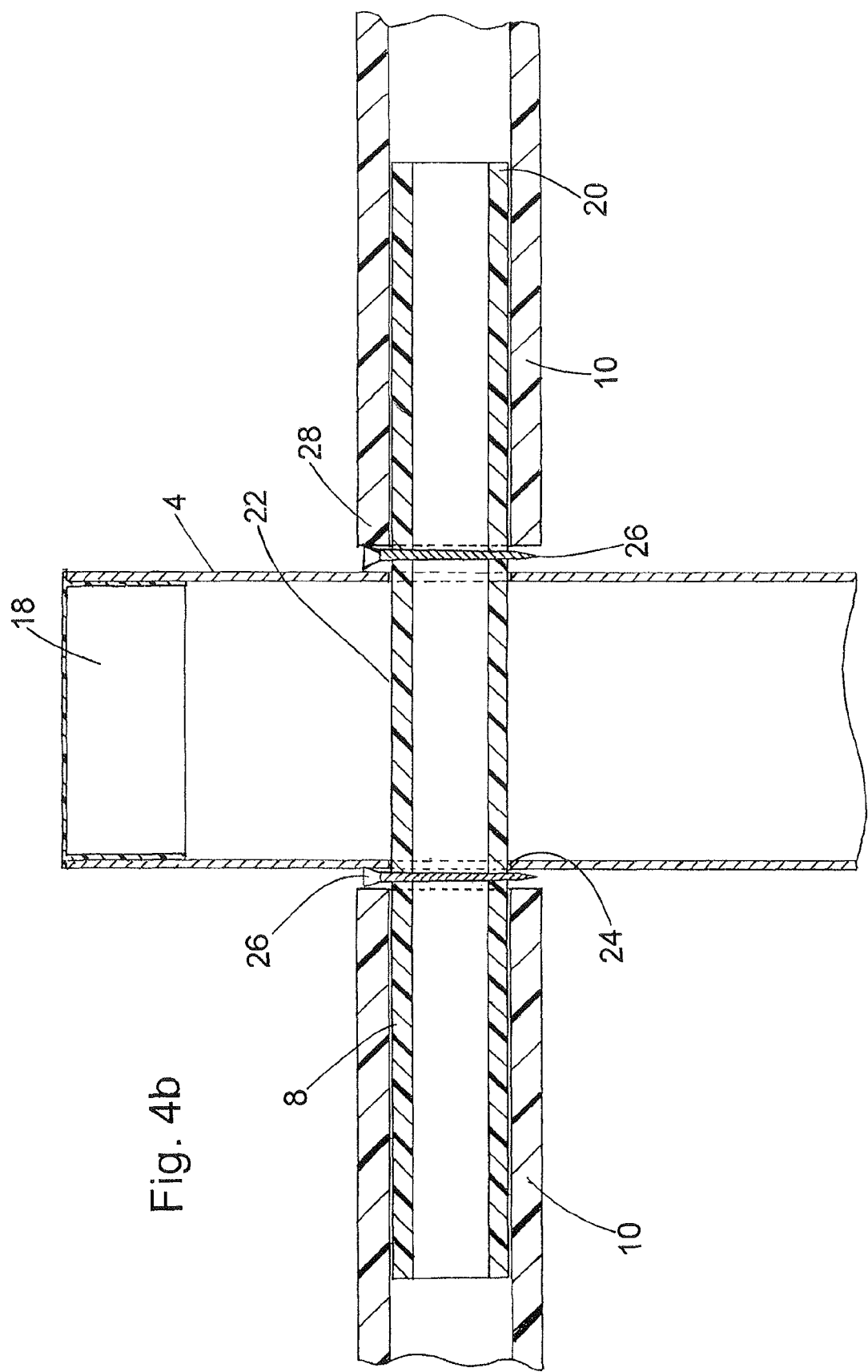

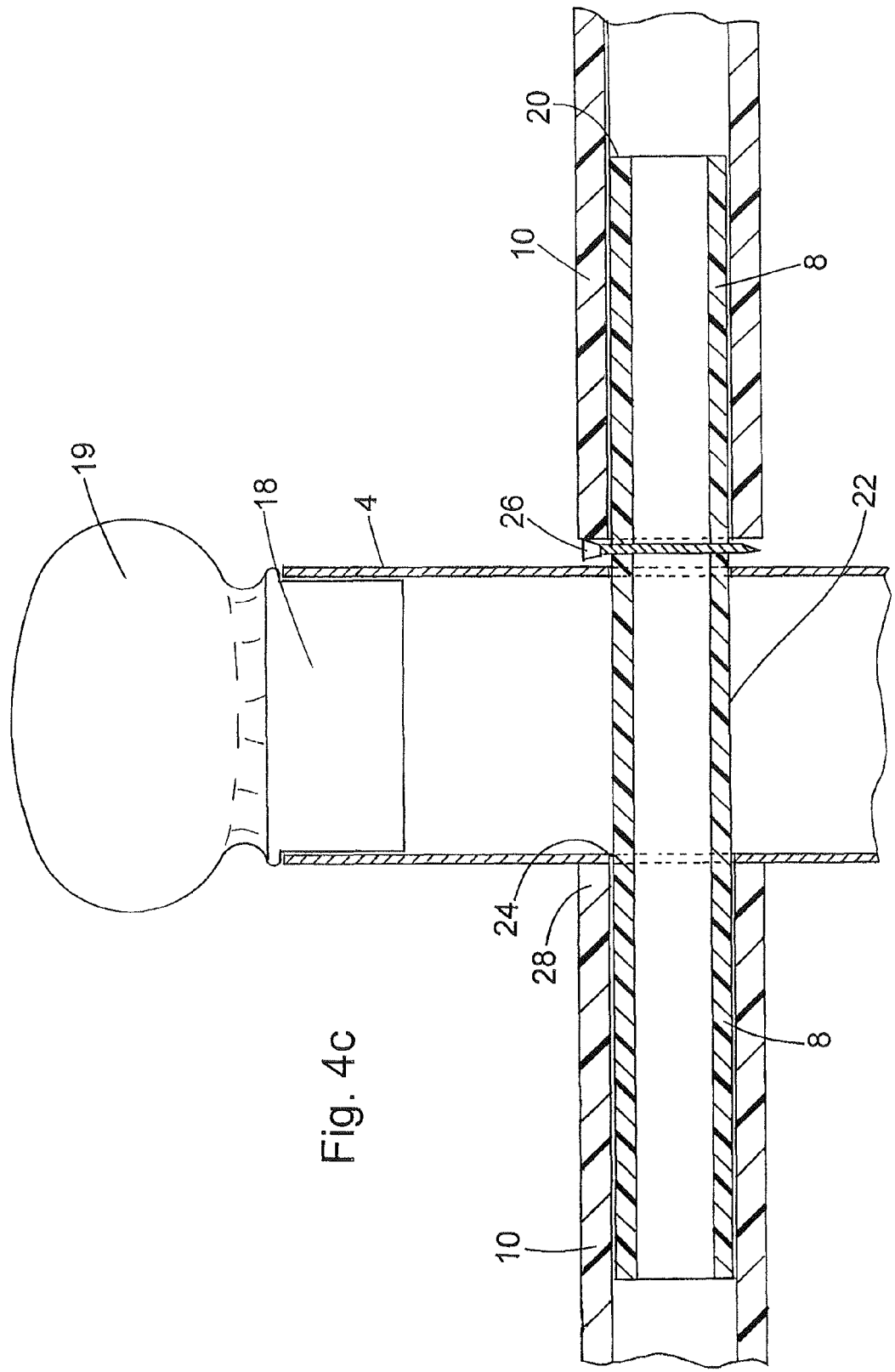

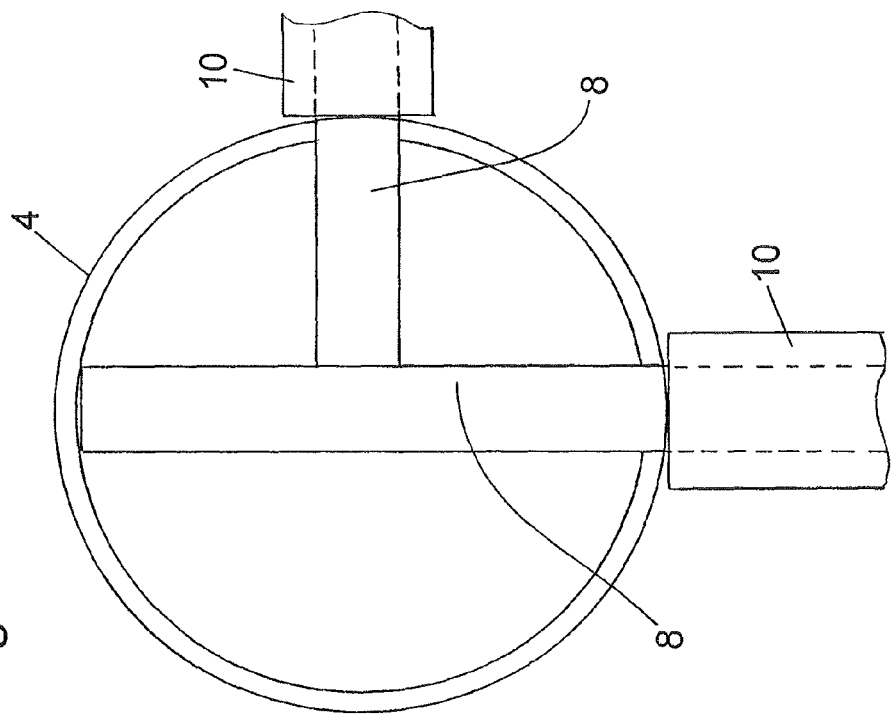
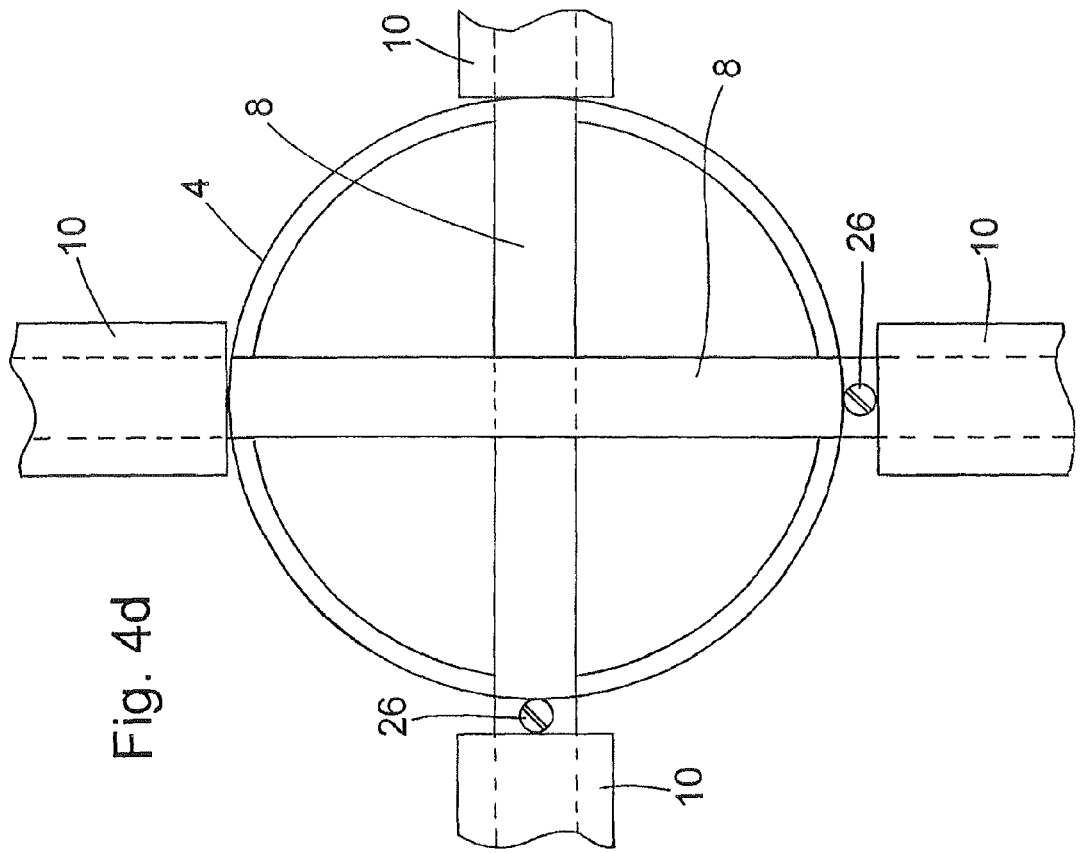

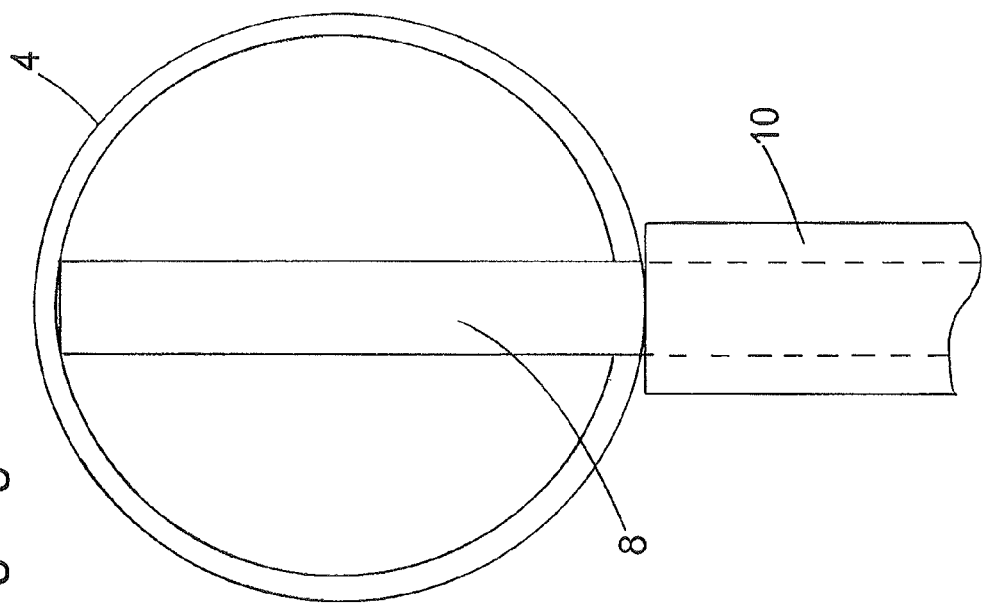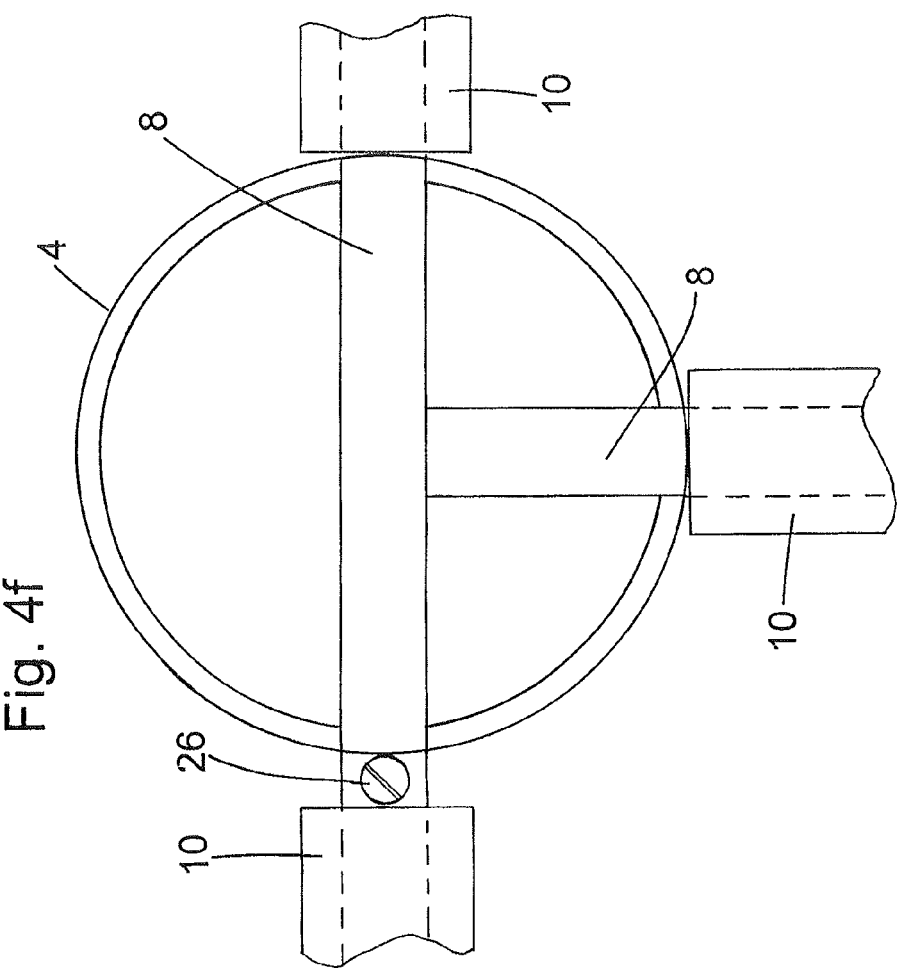

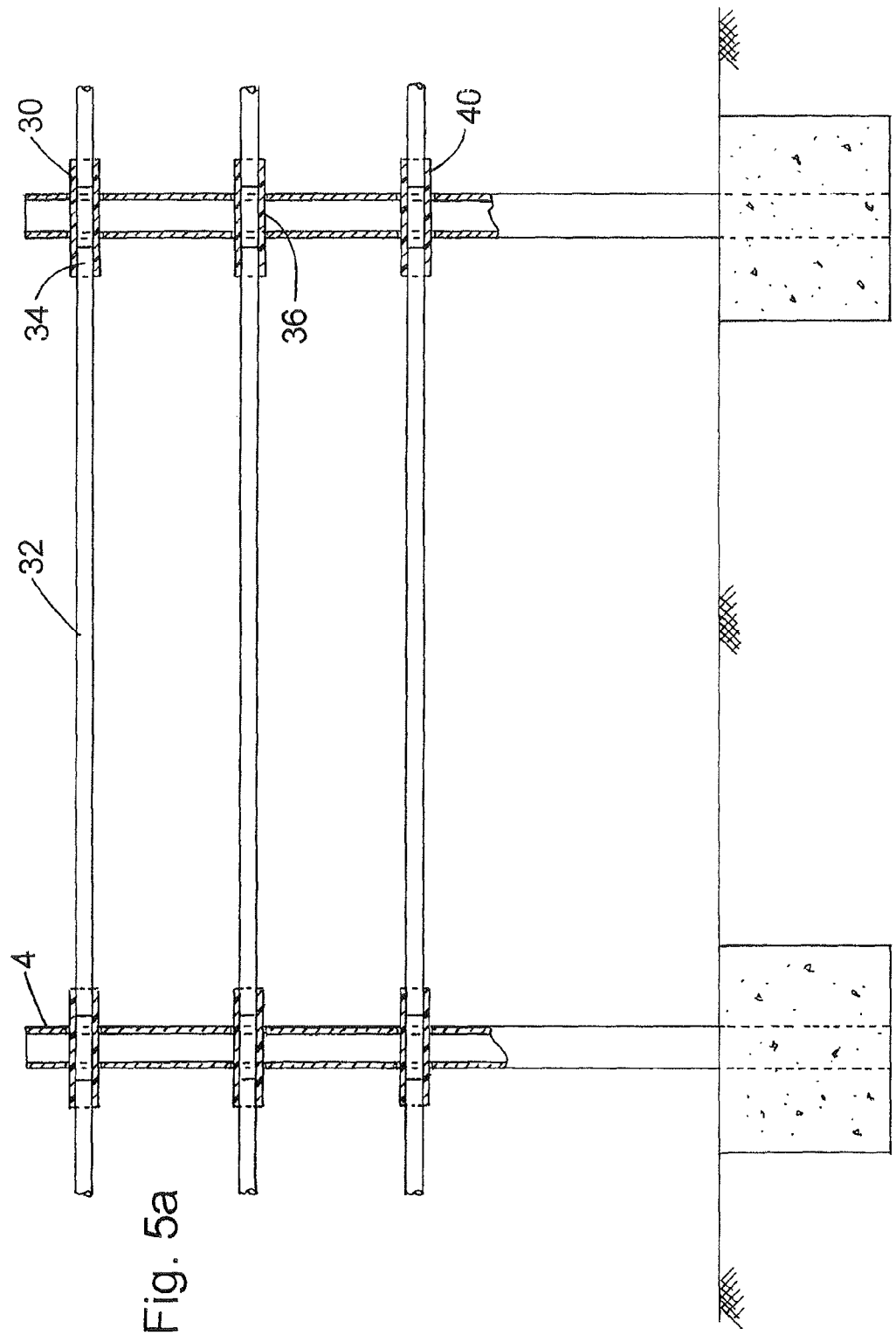

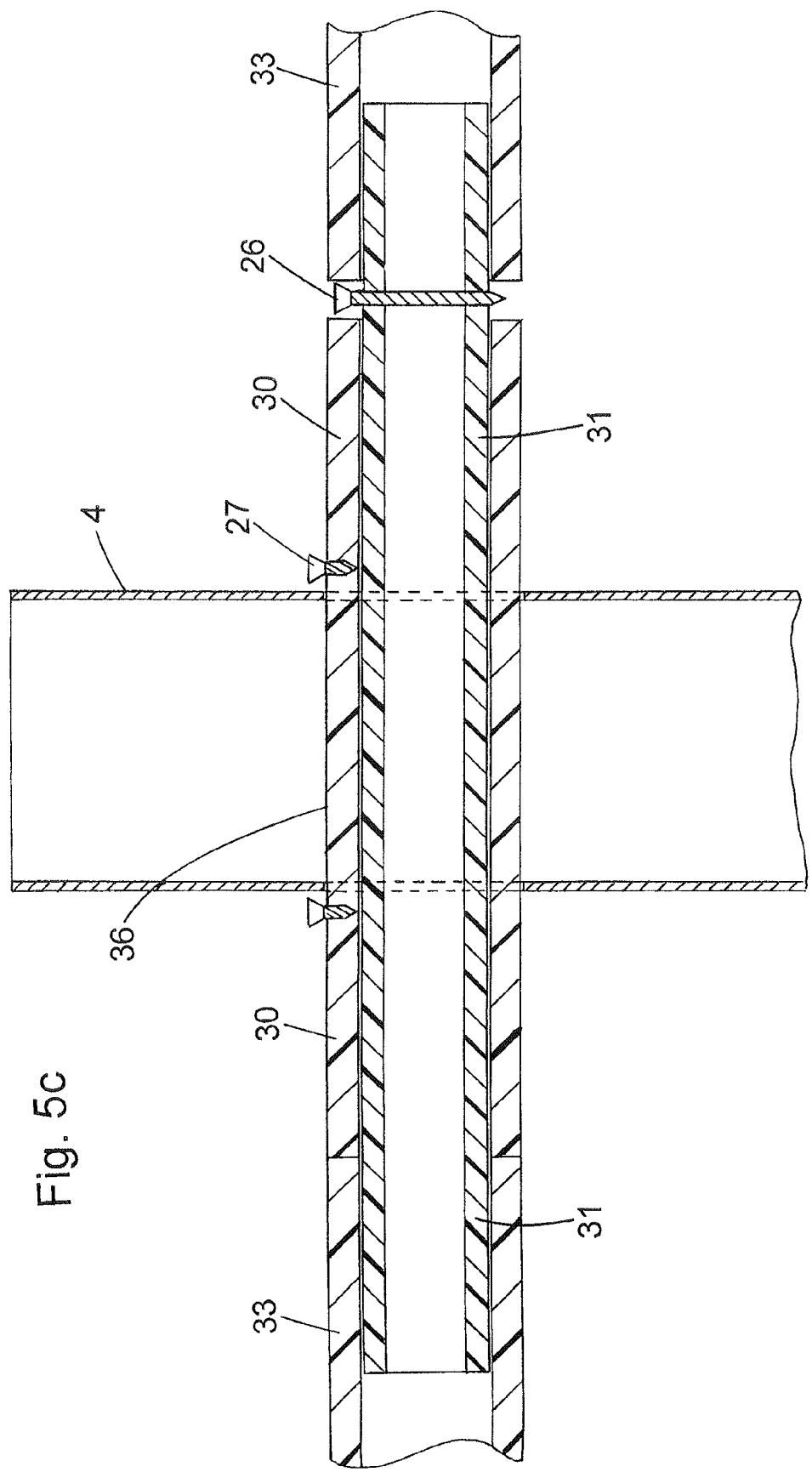

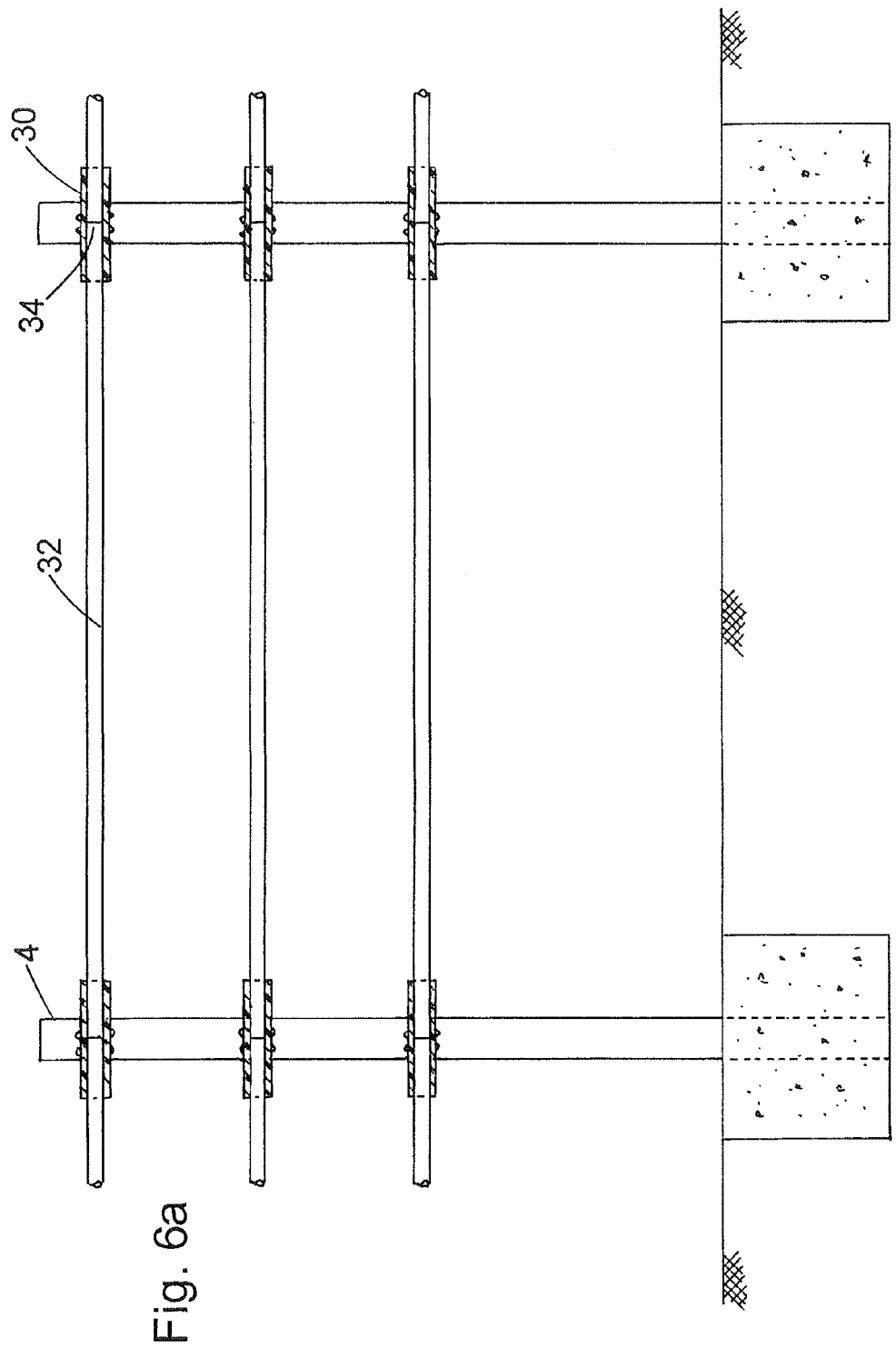

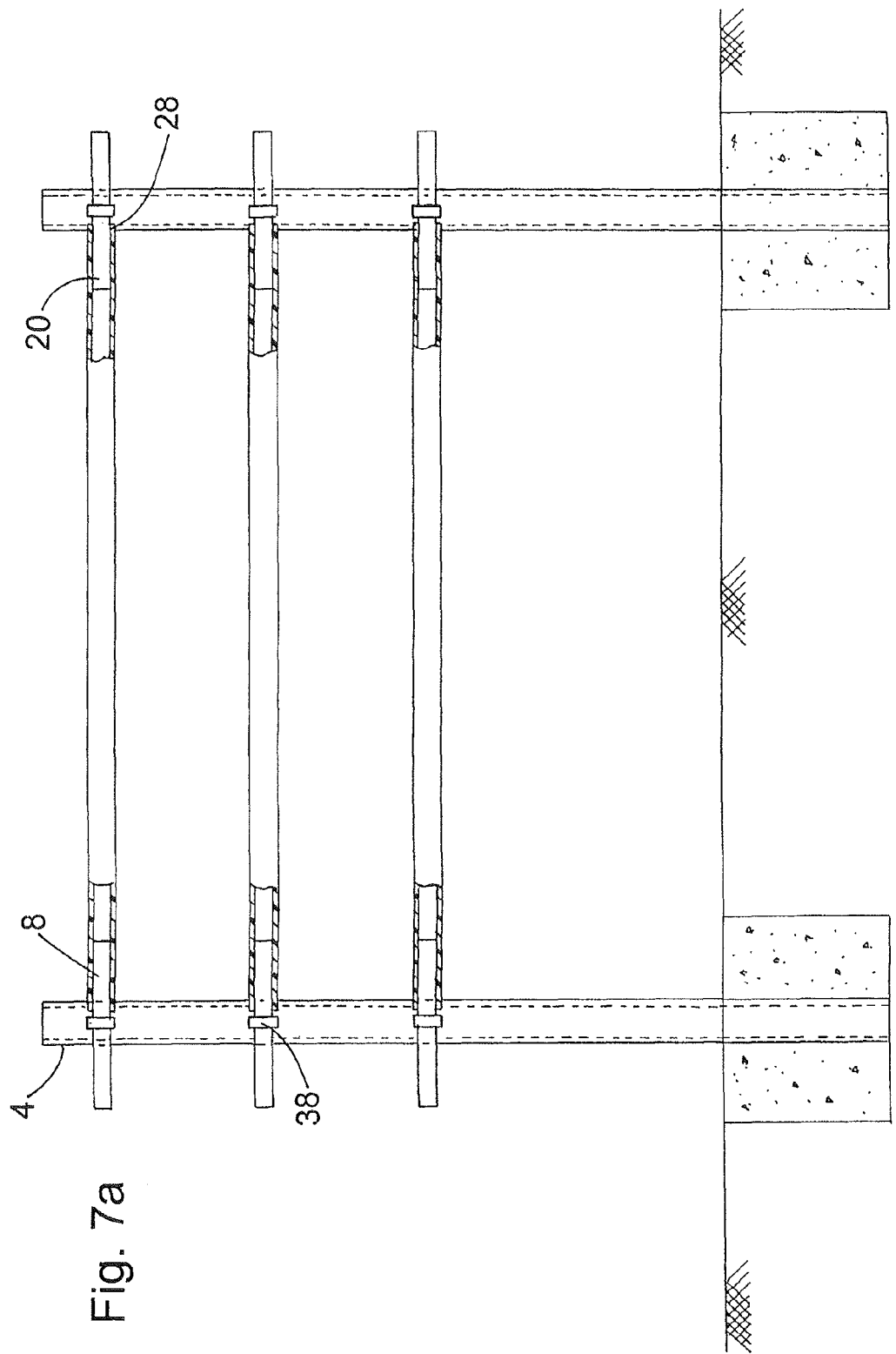

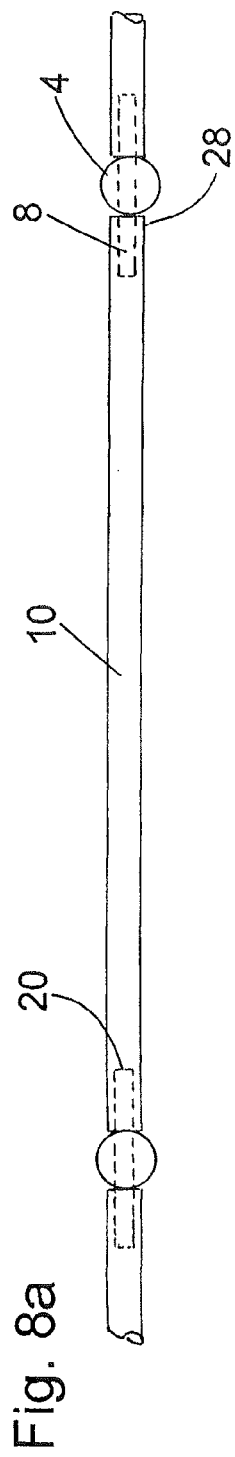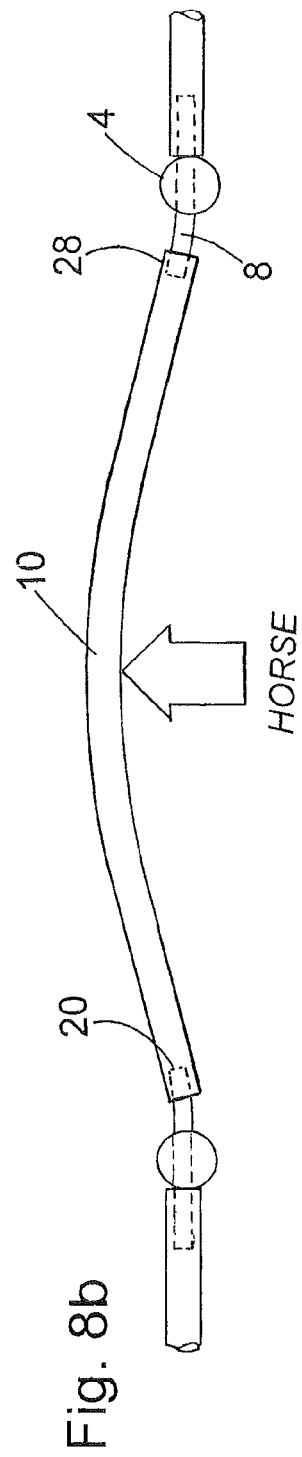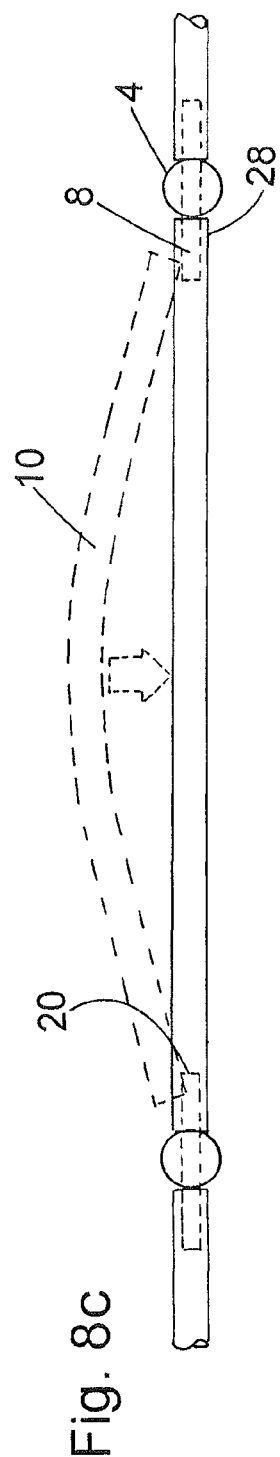

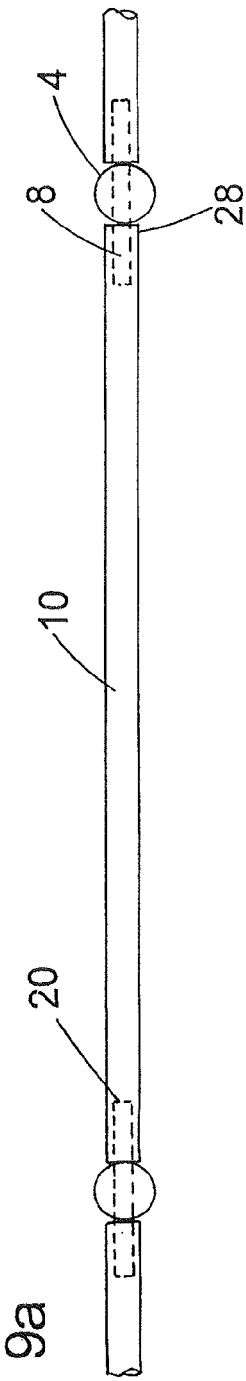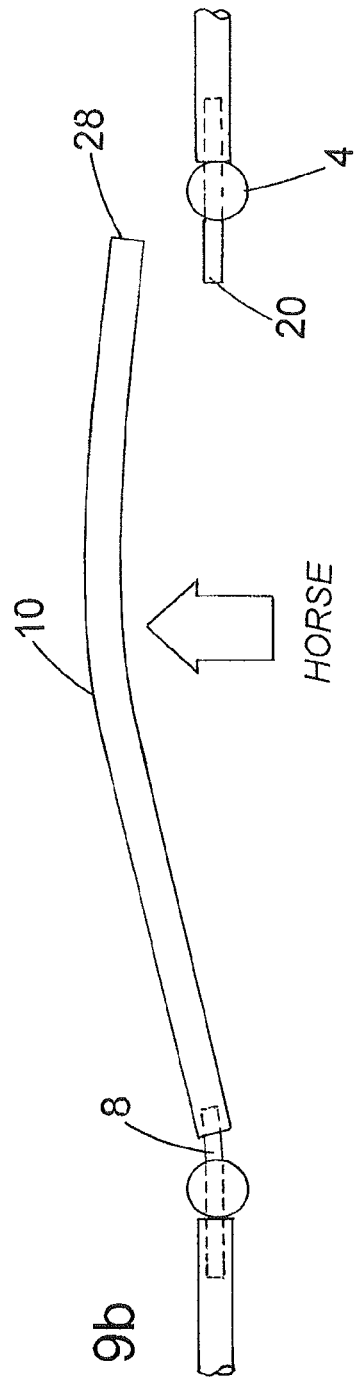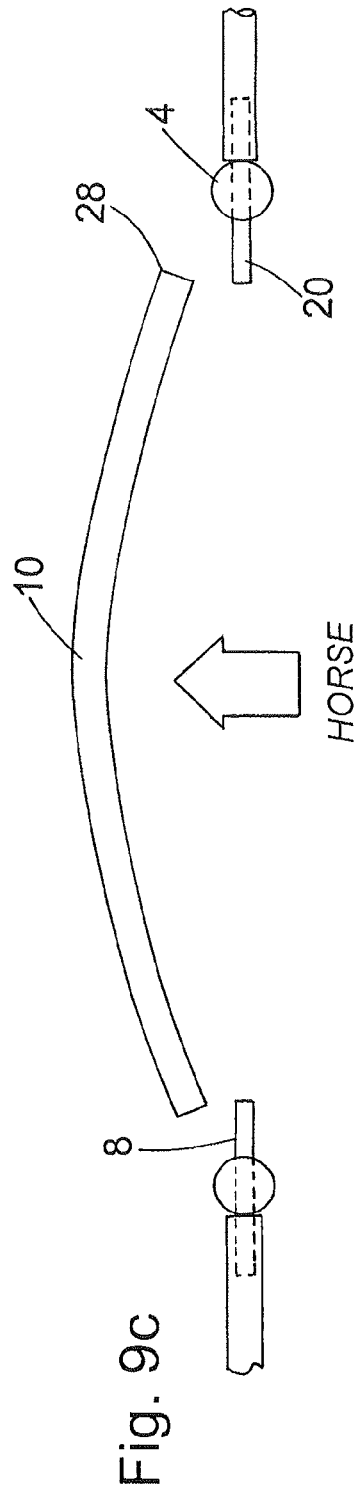

ANIMAL CONTAINMENT FENCE AND METHOD OF ASSEMBLING ANIMAL CONTAINMENT FENCE

BACKGROUND

Conventional fencing for containing animals often has a structure that prevents animals from escaping human control. Conventional fencing typically includes posts attached vertically to a surface and rails, chain-linking, or netting connected between the posts.

While some types of conventional fencing may have sturdy construction, and while strong materials may be used to construct a conventional fence, conventional fencing fails to provide strength and resiliency along with safety for the animals contained within the fence. Moreover, conventional fencing fails to provide safety to humans using the fence.

Animals contained within conventional fencing often brush against or collide with the conventional fencing, which may cause injury to the animal or damage the fence. In addition, conventional fencing may be hazardous to animals due to parts of the fence that have sharp or angled edges. The materials used to construct conventional fencing often splinter or fray, which may cut, abrade, puncture, or even ensnare animals that encounter the conventional fencing.

If an animal collides with a conventional fence, the fence may injure or even kill the animal upon impact. In addition, a damaged or destroyed conventional fence will often produce dangerous fragmentation that may further injure animals or people encountering the fence.

Conventional fencing does not safely yield to an impact. Often the fence will only partially yield to an impact from an animal, and the animal, or the animal and its rider will be injured or killed. For example, if a person riding a horse either loses control of the horse or guides the horse into a conventional fence, the horse and rider will likely be injured or killed by the impact, since the conventional fence would be incapable of safely yielding to the impact. Such an impact with a conventional fence may cause trauma to the horse and rider. The conventional fence may remain intact and fail to yield to the impact. The conventional fence may dangerously disintegrate into sharp fragments upon impact, which may injure or kill an animal or human. In addition, a human riding a horse, bull, or other large animal may be thrown from the animal, especially during competitions, and if the animal or human collides with a conventional fence, injury or death may occur. In the event that the rider is thrown from the large animal, the human may impact the conventional fence and be severely injured or killed due to the impact, and the animal may uncontrollably impact the fence, resulting in the injury or death of the animal.

In addition, conventional fencing is often used in competitions where animals jump the fencing as part of an obstacle course. Some competitions may involve large animals with human riders that guide or force the animals to jump the fence. Other competitions may involve small animals trained to jump fences or small animals that are guided and forced to jump over the fencing. In these competitions, the conventional fencing presents hazards if the animal impacts the fence, which may cause injury or death of the animal or a human rider.

It is noted that Larkins et al., U.S. Patent Application Publication No. 2010/0308293, discloses that a railing system, and more specifically a modular, stainless steel railing system, includes posts that secure to a mounting surface, rails that extend between the posts, coupling members for attaching the rails to the posts, and optionally a rail cap. In one embodiment disclosed in Larkins et al., the coupling members may take the form of a dowel or pin having an externally threaded portion that is threadably connected to the posts and another portion, either threaded or non-threaded, that is slidably received into the rails. In another embodiment disclosed in Larkins et al., the coupling members may take the form of sleeves inserted into the rails and mechanically attached thereto. Once attached to the rails, the sleeves are engaged by fasteners that extend through the post and operate to urge the rail and the post into close contact.

However, it is noted that Larkins et al. fails to disclose a fence or railing that protects an animal or human from injury caused from the impact with the fence or railing.

SUMMARY

The present invention provides an animal containment fence and a method of assembling an animal containment fence which avoids the foregoing problems.

Upon impact from an animal, the animal containment fence contains the animal, when the impact applies less force than a release force, and the animal containment fence is designed to prevent injury to the animal that impacts the fence. The fence includes at least two posts, and each post has a bottom end that is to be anchored to a surface and a top end that is to project away from the surface. The fence also includes connection members that have an oblong shape. Each connection member has two ends. The connection members are designed to be coupled to the posts, so that the oblong body of each connection member crosses the longitudinal body of a post. Each post has at least one connection member that is transversely coupled to the post.

The animal containment fence also includes at least one flexible cross-member made of polymeric material. The cross-member has opposite ends. Each of the opposite ends of a cross-member telescopically engage an end of a connection member that is transversely coupled to a post, the opposite ends of the cross-member are engaged with connection members that are engaged with adjacent posts, and each cross-member spans the space between the adjacent posts. The telescopic engagement of the cross-member with the connection members allows telescopic movement between the opposite ends of the cross-member and the ends of the connection members. The telescopic engagement is configured to reciprocate when the flexible cross-member is flexed due to an applied force sufficient to cause flexion, and the telescopic engagement between a connection member and an end of the cross-member is configured to release when a force that is sufficient to cause release is applied to the cross member.

The animal containment fence may include many posts, many connection members, and many flexible cross-members. Each connection member that is transversely coupled to a post may transversely pass through a passageway formed in the post. Alternatively, each connection member that is transversely coupled to a post may transversely pass through a collar disposed on the post.

Each flexible cross-member may be a pipe. The opposite ends of each flexible cross-member may include an inner cavity that receives one end of a connection member that is transversely coupled to a post, so that the inner cavity of the cross-member is telescopically engaged with the end of the connection member. In this configuration, the connection member may be a pipe having an outer diameter that fits within the inner cavity of one of the opposite ends of the flexible cross-member. A connector may pass laterally through each connection member at a position outside the post. The connection members may be formed of a polymeric material. The connector may be a self-tapping screw.

A connection member may also be a pipe having an inner cavity that receives one of the opposite ends of a flexible cross-member, so that an end of the flexible cross-member is telescopically received in the connection member.

The animal containment fence, having the flexible cross-members telescopically engaged with the connection members, may allow the opposite ends of the flexible cross-member to release from the connection members when a force sufficient to cause such a release is applied to the cross-member. The amount of force required to cause the cross-member to release from the connection member may be increased by placing longer connection members in telescopic engagement with the cross-member, or the amount of force required to cause the cross-member to release may be decreased by placing shorter connection members in telescopic engagement with the cross-member.

It should be noted that when the animal containment fence has longer connection members, the animal containment fence may more readily contain animals by requiring the application of a larger amount for force to the cross-members, in order to cause the cross-members to release from the connection members. However, since a larger amount of force may be applied to a cross-member to cause the cross-member to release, injury to an animal or a human that collides with the animal containment fence may more readily occur when the longer connection members are used, since the cross-members will provide more resistance upon impact. On the other hand, if the connection members have a shorter length, the cross-members will release from the shorter connection members upon the application of less force to the cross-members than the force that is required for the cross-members to release from the longer connection members; and the animals that are contained by the animal containment fence will be able to escape containment more easily by applying less force to the cross-members coupled to the shorter connection members. Therefore, it should be noted that a balance between the benefits of containing animals and protecting animals and humans from injury due to an impact with the fence may be optimized by configuring the length of the connection members to the safety and containment requirements of the fence and the size of, and forces applied by, the animals to be contained.

A method of assembling the animal containment fence may include steps of anchoring posts to a surface, passing a small diameter pipe through a passage that is transversely formed in one of the posts, and then telescopically and reciprocally engaging a cavity in one end of a large diameter pipe around one end of the small diameter pipe that extends from a side of the post in a lateral direction. The method may also include a step of aligning a cavity in the other end of the large diameter pipe with an opening to a passageway that is formed transversely through an adjacent post. Another small diameter pipe may be passed through the passageway formed in the adjacent post and into the cavity formed in the end of the large diameter pipe that is aligned with the opening to the passageway of the adjacent post. The method allows the opposite ends of the large diameter pipe to be telescopically and reciprocally engaged with the ends of the small diameter pipes that are disposed in the passageways of the adjacent posts.

The method may also include a step of inserting a connector laterally through a small diameter pipe in a position on the small diameter pipe that extends laterally from one side of a post before the cavity of a large diameter pipe is telescopically and reciprocally engaged around an end of the of the small diameter pipe. The method may include driving a self-tapping screw as the connector through the small diameter pipe.

The present invention may include an animal containment fence for containing an animal upon an impact from the animal when the impact applies less force than a release force for preventing injury to the animal upon impacting the fence, which includes:

at least two posts, each post of the at least two posts having a bottom end for anchoring to a surface and top end projecting away from the surface;

at least two connection members, each connection member of the at least two connection members having an oblong shape and two ends, and at least one connection member of the at least two connection members being transversely coupled to each post; and at least one flexible cross-member, each flexible cross-member of the at least one flexible cross-member being constructed from at least one polymeric material, the at least one flexible cross-member having opposite ends, each of the opposite ends having a telescopic engagement with one end of the two ends of two connection members of the at least two connection members transversely coupled to adjacent posts of the at least two posts to permit telescopic movement between the at least one cross-member and the at least two connection members, the telescopic engagement being configured to move reciprocally upon a flexion of the at least one flexible cross-member caused by an applied force less than a release force and to release upon a flexion of the at least one flexible cross-member caused by an applied force equal to or greater than the release force.

The animal containment may be configured such that the at least two posts comprises a plurality of posts, the at least two connection members comprises a plurality of connection members, and the at least one flexible cross-member comprises a plurality of flexible cross-members.

The animal containment fence may be configured such that the at least one connection member of the at least two connection members is transversely coupled to each post of the at least two posts by passing through a passageway formed in each post of the at least two posts.

The animal containment fence may be configured such that the at least one connection member of the at least two connection members is transversely coupled to each post of the at least two posts by passing through a collar disposed on each post of the at least two posts.

The animal containment fence may be configured such that each flexible cross-member of the at least one flexible cross-member is a pipe, and opposite ends thereof each have an inner cavity receiving, in the telescopic engagement, one end of the ends of the two connection members coupled to the adjacent posts.

The animal containment fence may be configured such that each connection member of the at least two connection members is a pipe having an outer diameter fitting within the inner cavity of the opposite ends of the at least one flexible cross-member.

The animal containment fence may further include at least one connector passing laterally through each of the at least two connection members at a position outside the at least two posts.

The animal containment fence may be configured such that the at least two connection members are constructed from at least one polymeric material and the at least one connector is at least one self-tapping screw.

The animal containment fence may be configured such that each connection member of the at least two connection members is a pipe, and the two ends each have an inner cavity receiving, in the telescopic engagement, one end of the opposite ends of the at least one flexible cross-member.

The animal containment fence may be configured such that the release force is greater for two connection members of the at least two connection members having a longer length than the release force for two connection members of the at least two connection members having a shorter length.

The animal containment fence may further include a ball fixed to the top end of at least one post of the at least two posts, a largest dimension of a radial cross section of the ball being substantially equal to or greater than a largest dimension of a radial cross section of the at least one post.

The present invention may include an animal containment fence for containing an animal upon an impact from the animal when the impact applies less force than a release force for preventing injury to the animal upon impacting the fence, which includes:

at least two posts, each post of the at least two posts having a bottom end for anchoring to a surface and a top end of each post of the at least two posts being disposed away from the surface, at least one passageway being transversely formed through each post of the at least two posts;

at least two smaller diameter pipes, each of the at least two smaller diameter pipes having two ends, one of the at least two smaller diameter pipes being disposed in a passageway of the least one passageway formed through each post, and at least one end of the two ends of each smaller diameter pipe of the at least two smaller diameter pipes extending laterally from the at least two posts; and at least one larger diameter flexible pipe constructed of at least one polymeric material, the at least one larger diameter flexible pipe having opposite ends, each of the opposite ends having a telescopic engagement around one end of the two ends of two smaller diameter pipes of the at least two smaller diameter pipes disposed in passageways of the at least one passageway formed through adjacent posts of the at least two posts to permit telescopic movement between the at least one larger diameter flexible pipe and the at least two smaller diameter pipes, the telescopic engagement being configured to move reciprocally upon a flexion of the at least one larger diameter flexible pipe caused by a force less than a release force applied to the at least one larger diameter flexible pipe, and the telescopic engagement being configured to release upon a flexion of the at least one larger diameter flexible pipe caused by a force equal to or greater than a release force applied to the larger diameter flexible pipe.

The animal containment fence may be configured such that the at least two posts comprises a plurality of posts, the at least two smaller diameter pipes comprises a plurality of smaller diameter pipes, and the at least one larger diameter flexible pipe comprises a plurality of larger diameter flexible pipes.

The animal containment fence may further include at least one connector passing laterally through each of the at least two smaller diameter pipes at a position outside the at least two posts.

The animal containment fence may be configured such that the at least two smaller diameter pipes are constructed from at least one polymeric material and the at least one connector is at least one self-tapping screw.

The animal containment fence may further include a ball fixed to the top end of at least one post of the at least two posts, a largest dimension of a radial cross section of the ball being substantially equal to or greater than a largest dimension of a radial cross section of the at least one post.

The animal containment fence may be configured such that two or more smaller diameter pipes of the at least two smaller diameter pipes are disposed in separate passageways of the at least one passageway formed in one post of the at least two posts, the separate passageways being at different heights between the top end and the bottom end of the one post, and the separate passageways being transversely formed through the one post in different radial directions.

The animal containment fence may be configured such that a first smaller diameter pipe and a second smaller diameter pipe of the at least two smaller diameter pipes are disposed in separate passageways of the at least one passageway formed in one post of the at least two posts, the separate passageways being at substantially the same height between the top end and the bottom end of the one post, the separate passageways being formed through the one post in different radial directions, and a first end of the two ends of the second smaller diameter pipe abutting a side of the first smaller diameter pipe at a position inside the one post.

The animal containment fence may be configured such that a first end of the two ends of the first smaller diameter pipe is disposed inside the one post, a second end of the first small diameter pipe and a second end of the second smaller diameter pipe extend from sides of the one post, and the second end of the first small diameter pipe and the second end of the second smaller diameter pipe are each in telescopic engagement with one of the opposite ends of separate larger diameter flexible pipes of the at least one larger diameter flexible pipe.

The animal containment fence may be configured such that the two ends of the first smaller diameter pipe and a second end of the second smaller diameter pipe extend from sides of the one post, and the two ends of the first smaller diameter pipe and the second end of the second smaller diameter pipe are each in telescopic engagement with one of the opposite ends of separate larger diameter flexible pipes of the at least one larger diameter flexible pipe.

The animal containment fence may be configured such that a smaller diameter pipe of the at least two smaller diameter pipes is disposed in a passageway of the at least one passageway in one post of the at least two posts, a first end of the two ends of the smaller diameter pipe being disposed at a position inside the one post, a second end of the smaller diameter pipe extending from a side of the one post, and the second end of the smaller diameter pipe being in telescopic engagement with one of the opposite ends of one larger diameter flexible pipe of the at least one larger diameter flexible pipe.

The present invention may include an animal containment fence for containing an animal upon an impact from the animal when the impact applies less force than a release force for preventing injury to the animal upon impacting the fence, the fence comprising:

at least two posts, each post of the at least two posts having a bottom end for anchoring to a surface and top end projecting away from the surface, at least one passageway being transversely formed through each post of the at least two posts;

at least two hollow connection members, each hollow connection member of the at least two hollow connection members having an oblong shape and two opposite open ends, one hollow connection member of the at least two hollow connection members being disposed through one passageway of the at least one passageway in each post;

at least two interior members, each interior member of the at least two interior members having two ends, each hollow connection member having a hollow portion retaining one interior member of the at least two interior members, the two ends of the at least two interior members extending outside the opposite open ends of the at least two hollow connection members; and at least one flexible cross-member constructed of at least one polymeric material, the at least one flexible cross-member having opposite ends, each of the opposite ends of the at least one flexible cross-member having a telescopic engagement around one end of the two ends of two interior members of the at least two interior members disposed in adjacent posts of the at least two posts to permit telescopic movement between the at least one flexible cross-member and the two interior members, the telescopic engagement being configured to move reciprocally upon a flexion of the at least one flexible cross-member caused by an applied force less than a release force and to release upon a flexion of the at least one flexible cross-member caused by an applied force equal to or greater than the release force.

The present invention may include a method of assembling an animal containment fence including the following steps:

anchoring at least two posts to a surface;

passing a first smaller diameter pipe through a transverse passage formed in a first post of the at least two posts;

telescopically and reciprocally engaging a cavity of a first end of a larger diameter pipe around one end of the first smaller diameter pipe extending laterally from one side of the first post;

aligning a cavity of a second end of the larger diameter pipe with an opening of a transverse passage formed in a second post of the at least two posts;

passing a second smaller diameter pipe through the transverse passage formed in the second post of the at least two posts, wherein the cavity of the second end of the larger diameter pipe is telescopically and reciprocally engaged around one end of the second smaller diameter pipe.

The method of assembling an animal containment fence may further include a step of inserting a connector laterally through the first smaller diameter pipe in at least one position on the first smaller diameter pipe extending laterally from one side of the first post before telescopically and reciprocally engaging the cavity of the first end of the larger diameter pipe around the one end of the first smaller diameter pipe.

The method of assembling an animal containment fence may be performed such that the step of inserting a connector includes driving a self-tapping screw through the first smaller diameter pipe.

BRIEF DESCRIPTION OF THE DRAWINGS

FIG. 1 is a perspective view of an embodiment of the animal containment fence.

FIG. 2 is a side cross-sectional view of an embodiment of a post of the animal containment fence.

FIG. 3 is a side cross-sectional view of an embodiment of the animal containment fence.

FIGS. 4a, 4b, and 4c are side cross-sectional views of a top of a post of embodiments of the animal containment fence.

FIGS. 4d, 4e, 4f, and 4g are top views of connection members transversely coupled to posts in embodiments of the animal containment fence.

FIG. 5a is a side cross-sectional view of an embodiment of the animal containment fence.

FIG. 5c is a side cross-sectional view of a top of a post of an embodiment of the animal containment fence.

FIG. 6a is a side cross-sectional view of an embodiment of the animal containment fence.

FIG. 7a is a side cross-sectional view of an embodiment of the animal containment fence.

FIGS. 8a, 8b, and 8c are top views of an embodiment of the animal containment fence.

FIGS. 9a, 9b, and 9c are top views of an embodiment of the animal containment fence.

DETAILED DESCRIPTION

Figure 5B:
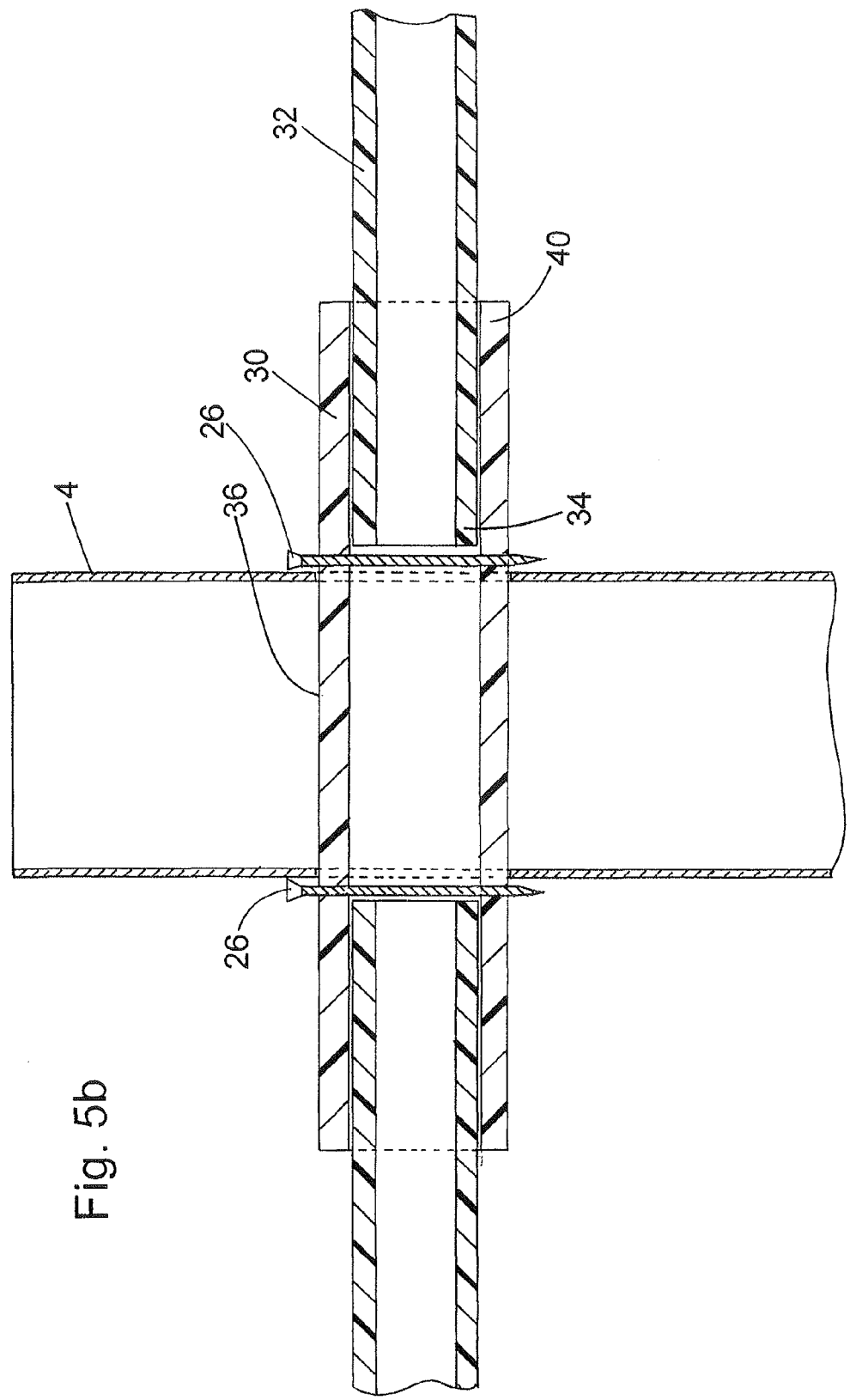
FIG. 5b is a side cross-sectional view of a top of a post of an embodiment of the animal containment fence.

While the subject matter disclosed herein is subject to various modifications and alternative constructions, certain illustrated embodiments thereof have been shown in the drawings and will be described below in detail. It should be understood, however, that there is no intention to limit the subject matter of this disclosure to the specific form disclosed, but, on the contrary, to cover all modifications, alternative constructions, and equivalents falling within the spirit and scope of the subject matter disclosed in this specification and defined in the claims.

As noted above, conventional fencing presents hazards to animals and humans, because conventional fencing does not safely yield to an impact from an animal or human, and because conventional fence designs having sharp edges and materials that may fragment or splinter, and may injure or kill animals or humans upon impact with the conventional fence.

The invention is an animal containment fence and a method of assembling an animal containment fence, which addresses the foregoing problems.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

FIG. 1 illustrates a perspective view of an embodiment of an animal containment fence 2. FIG. 1 also illustrates a horse standing in front of the animal containment fence.

FIG. 2 illustrates a side cross-sectional view of an embodiment of a post 4 of the animal containment fence. In this embodiment, the post 4 has three holes 6. In FIG. 2, the holes 6 each form an opening for three passageways that pass transversely through the post. It should be noted that the post in this embodiment is not limited to three passageways and may have one, two, three, or more passageways, as needed. The post illustrated in FIG. 2 has three passageways that are disposed in the same direction. It should be noted that the posts of the animal containment fence are not limited to the embodiment illustrated in FIG. 2, and the passageways may be formed through the post in different radial directions. In addition, passageways may be formed through the post at different inclines with respect to the top and bottom ends of the post.

FIG. 3 illustrates a side cross-sectional view of an embodiment of the animal containment fence. The animal containment fence 2 illustrated in FIG. 3 includes posts 4, connection members 8 transversely coupled to the posts, and cross-members 10 connected between the posts using the connection members. The animal containment fence may include one or more cross-members connected between adjacent posts. In FIG. 3, three cross-members are connected between the adjacent posts. Each end of a cross-member is connected to a post by a connection member transversely coupled to the post.

The posts 4 have bottom ends 12 that may be anchored to a surface 14. The bottom ends 12 of the posts 4 may be sunk in the surface, such as the ground, and set in concrete 16, as illustrated in FIG. 3. It is also possible to permanently or temporarily anchor the bottom ends 12 of each post 4 on a variety of surfaces using different structures including, but not limited to posts sunk in the ground without concrete, posts set in a concrete floor, posts attached to braces which are placed, staked, or otherwise disposed on the ground, and posts temporarily anchored in sand, gravel, snow, etc. In addition, the posts of different sections of the fence may be anchored to different surfaces, and not all of the posts of the fence need to anchored to a surface in the same manner, so long as an top end 17 of each of the fence posts projects away from the surface to which the bottom end 12 of each of the fence posts is anchored. It should also be noted that the individual posts of one section of the fence may be anchored to a surface or surfaces having the same or different incline than surfaces to which posts in other sections of the fence are anchored.

The posts may be arranged in many different configurations across one or more surfaces. For example, the posts may be anchored to a surface in series, in parallel, in circular patterns, in rectangular patterns, in patterns having polygon shapes, in irregular patterns, etc. In addition, the posts may be arranged over areas spanning many miles; the posts may form the periphery of an arena or corral; the posts may even be arranged in pairs of two or more to form obstacle fences for an obstacle course. In addition, a post may connect two or more sections of fence in a tee, a cross, or other configurations.

The posts may be constructed from a variety of different materials such as metal, wood, polymeric materials, etc. The posts are not limited to any particular shape; however, it is preferred that the posts have a shape without sharp or angular edges, to prevent causing injury to an animal or human that may collide or brush against the posts. In one embodiment the posts are formed of sections of metal piping having a circular cross-section.

In FIGS. 3, 4a, 4b, and 4c, the posts 4 are formed as a hollow member such as a pipe. FIGS. 4a and 4b illustrate an embodiment of a cap 18 fitted in the top end of the post 4. The cap 18 protects animals and humans from the angular or sharp edges of the end of the pipe that forms the post.

FIG. 4c illustrates another embodiment of a cap 18 having a ball 19 formed on the top thereof. The ball 19 may be formed as part of a cap 18 by welding, molding, carving, lathing, fastening, etc. In addition, the ball 19 may be formed directly on the top of any type of post, without being formed as part of a cap. A ball 19 may be placed on the top of specific posts at different locations in the animal containment fence. A ball may also be placed on one post, adjacent posts, every post, every other post, random posts, or any arrangement preferable for the configuration of the animal containment fence. The ball may have a shape that is spherical, semi-spherical, ovoid, etc. In one embodiment of the ball, the largest dimension of the radial cross section of the ball is substantially equal to or greater than the largest dimension of the radial cross section of the post to which the ball is attached. In another embodiment of the ball, the largest dimension of the radial cross section of the ball is less than the largest dimension of the radial cross section of the post to which the ball is attached. The ball 19 may easily receive a halter of an animal. The halter may be looped over the ball or otherwise tied or fastened to the ball.

FIGS. 3, 4a, 4b, and 4c, illustrate connection members 8 that are transversely coupled to each of the posts 4. The fence illustrated in FIG. 3 has three connection members 8 transversely coupled to each post 4. Each post has at least one connection member 8 to connect to a cross-member 10. It is preferred that more than one connection member is transversely coupled to each post. Each connection member may be transversely coupled to a post at a different height on the post. In addition, connection members may be transversely coupled to a post at the same height, in order to form a tee or corner, as discussed below. Each of the connection members has a generally oblong shape and two ends 20. Each end of the connection members 8 illustrated in FIGS. 3, 4a, 4b, and 4c extends laterally from the body of a post 4. In FIGS. 3, 4a, 4b, and 4c, one end of the two ends 20 of a connection member 8 extends laterally away from a post 4 in a direction that is opposite from the other end of the connection member. In FIGS. 3, 4a, 4b, and 4c, one end of each of the connection members extends laterally from the post to which the connection member is transversely coupled, and extends toward the adjacent post of the fence. It is preferred that the length of extension of each of the two ends of the connection member is less than half of the distance between adjacent posts of the fence.

The connection members 8 transversely coupled to the posts 4, as illustrated in FIGS. 3, 4a, 4b, and 4c, are orientated so that the longitudinal axis of each of the connection members 8 is substantially orthogonal to the longitudinal axis of the posts 4. However, it is important to note that the fence is not limited to this configuration and the connection members may be transversely coupled to the posts at any transverse angle, so long as the longitudinal axis of the body of every connection member is disposed transversely to the longitudinal axis of the body of the post to which the connection member is coupled. For example, multiple connection members may be transversely coupled to a single post, and each connection member may be oriented in a different radial direction and at a different angle of incline with respect to the top and bottom ends of the posts.

In addition, it should be noted that a bottom end of a post may be anchored to a surface and a top end of the post may project away from the surface, and the longitudinal axis of the post may be oriented orthogonally or substantially orthogonally with respect to the surface to which the post is anchored. In addition the bottom end of a post may be anchored to a surface and an angle between the surface and the longitudinal axis of the post may be greater than ninety degrees with respect to at least one position on the post, i.e., the post may be anchored to a surface at an oblique angle. In addition, each post in a row of posts of the animal containment fence may be anchored to a surface at the same or substantially the same oblique angle, and each post may lean in the same or substantially the same direction. In one embodiment, a row of posts of the animal containment fence, having connection members transversely coupled thereto, and having cross-members engaged with the connection members that are transversely coupled to adjacent posts, may lean obliquely; and an angle between one side of the animal containment fence and the surface to which the posts are anchored may be less than ninety degrees, i.e. an acute angle, while an angle between the opposite side of the animal containment fence and the surface may be greater than ninety degrees, i.e. an obtuse angle. While the posts of the animal containment fence my lean in an oblique angle, the cross-members and connection members interconnecting the posts may be parallel, substantially parallel, or have another angle with respect to the surface to which the bottom ends of the posts may be anchored. The animal containment fence may be configured so that a row of posts lean in the above-noted oblique orientation, in order to prevent animals from colliding with or rubbing against the fence when the animals travel along the side of the fence having the obtuse angle with respect to the surface. In this configuration, an animal's head or body is prevented from rubbing against the fence, since the fence leans away from the animal. In addition, when a human rides an animal, a human typically straddles the animal's flank or mid-section, which naturally bulges outward from the side of the animal. The human's legs may be pushed outward by the animal's mid-section. When a human rides an animal along a side of the animal containment fence having an obtuse angle between the side of the fence and the surface, the human will be protected from rubbing his or her feet or legs against the fence, and the human's feet or legs will not become ensnared with the fence. In yet another embodiment, the posts of the animal containment fence forming a corral may form an obtuse angle between the surface on the inside of the corral and the side of the animal containment fence, thereby preventing animals or humans riding animals within the corral from rubbing against the side of the animal containment fence. In another embodiment, the posts of the animal containment fence forming a corral may form an acute angle between the surface on which animals stand, such as the inside of the corral, and the side of the animal containment fence. In the embodiments of the fence illustrated in FIGS. 3, 4a, 4b, and 4c, the connection members 8 are transversely coupled to the posts by passing through passageways 22 formed through the posts in a direction that is transverse to the longitudinal axis of the bodies of the posts. The passageway receives a connection member 8 and allows the connection member to be disposed transversely through the post. In the embodiment illustrated in FIGS. 3, 4a, 4b, and 4c, one passageway transversely couples one connection member to a post. FIGS. 4a, 4b, and 4c illustrate an embodiment where the post is formed as a pipe, and a passageway is formed transversely through the pipe, by forming two holes 24 in the pipe. The two holes 24 are formed in two locations on the sides of the pipe to form a passageway that allows the connection member to pass transversely through the sides of the post. Numerous passageways may be formed transversely through a post in the same or different radial directions, at the same or different height between the top end and the bottom end of the post, and at the same or different inclines with respect to the top end and bottom end of the post.

In addition, it should be noted that the passageways may be formed in posts having different structures or materials of construction. For example, the passageways may be formed through solid or hollow posts constructed from polymeric materials, wood, metal, other material, or combination of materials that are suitable for the construction of a post.

FIG. 3 illustrates an embodiment of the fence including two posts 4 in the form of hollow pipes. Each of the posts illustrated in FIG. 3 has three passageways 22. One connection member 8 is disposed transversely through each passageway 22 in each of the posts 4. The posts and connection members are not limited to the configuration illustrated in FIG. 3 and each post may retain one connection member, two connection members, three connection members, or a plurality of connection members. FIG. 3 also illustrates that the connection members 8 pass completely through the passageways 22 in the posts 4; and one end of the two ends of each connection member extends laterally from a part of the post, while the other end of the connection member extends laterally from another part of the post.

In the embodiments illustrated in FIGS. 3, 4a, 4b, and 4c, the connection members 8 are oblong pipe structures. The connection members may have many cross-sectional shapes and dimensions, and the materials of construction used in the connection members may be tailored to specific climates or stresses of the environment in which the fence will be used. The connection members may be formed from a variety of materials including polymeric materials, metal, wood, resins, composites, etc. In addition, each individual connection member may have the same uniform shape as the other connection members, or the connection members in the fence may have different shapes. The connection members may have a cylindrical shape, a pipe shape, and may have cross-sectional shapes that may be round, square, rectangular, polygonal, elliptical, oval, irregular, etc. In addition, each of the connection members included in the fence may have the same dimensions among: length, width, diameter, inner diameter, outer diameter, etc., as compared to the other connection members; or the connection members may have different dimensions.

The connection members may be retained within the passageway by placing a connector laterally through the connection member at a position outside the passageway of the post. The connector may be a bolt, a pin, a screw such as a self-tapping screw, etc. FIGS. 4a and 4c illustrate a connector as one self-tapping screw 26 passing laterally through the connection member at a position on one side of the post 4. Each connection member passing through a post may be secured by one or more connectors. FIG. 4b illustrates another embodiment having two self-tapping screws serving as connectors that pass laterally through the connection member on either side of the post 4. In yet another embodiment, a connector may be placed through both the post and the connection member that is disposed through the passageway in the post. The connector may be a bolt, screw, pin, etc. which extends through the side of the post and through the connection member within the post, in order to prevent the connection member from sliding out of the passageway in the post. The connector may be configured to pass through any type of connection member including a pipe, a solid cylinder, or any other oblong shape.

In the embodiments of the animal containment fence that are illustrated in FIGS. 3, 4a, 4b, and 4c, the connection members 8 pass transversely through the post by passing through a passageway 22 formed in the post 4, and the ends 20 of the connection members extend laterally from the posts. An end 28 of a flexible cross-member 10 fits over an end 20 of a connection member 8 extending laterally from a post. In other words, the end 20 of a connection member fits within the hollow cavity of the end 28 of the flexible cross-member 10. The engagement between the ends of the connection members and the opposite ends of the flexible cross-members is telescopic and capable of reciprocating, which means that the end of the connection member may telescopically slide in and out of one of the opposite ends 28 of the flexible cross-member, upon application of a force to the flexible cross-member by an animal or a human. The end of the cross-member may float on, i.e. move while in contact with, the end of the connection member.

When a force is applied to the flexible cross-member, the flexible cross-member flexes, the distance between the opposite ends of the flexible cross-member shortens, and the opposite ends of the flexible cross member may either reciprocate on the ends of the connection members coupled to adjacent posts, or the ends of the flexible cross-member may release from one or both of the connection members coupled to adjacent posts, depending on the amount of force that is applied to the flexible cross-member, as discussed below.

In one embodiment, the outer perimeter of a cross-sectional dimension of the connection member may be slightly smaller than the interior perimeter of the hollow cavity of the cross-member in which the connection member is telescopically engaged, in order to prevent the connection members and cross-member from sliding part without application of a force thereto from an animal or a human. For example, a connection member may be a pipe having an outer diameter that is slightly smaller than the inner diameter of a pipe forming a flexible cross-member, within which the connection member is telescopically engaged.

It is preferred that the length of the connection members 8 that extend from the side of a post 4 be the same on either side of the post, so that the length of the ends of the connection member 8 that are received into the ends of flexible cross-members 10 on either side of the post is symmetrical, to ensure that the release strength of the flexible cross-members 10 on either side of the post 4 may be the same.

As noted above, FIGS. 4a, 4b, and 4c, illustrate the connector as a self-tapping screw 26 passing laterally through a connection member 8. The connector may prevent a connection member 8 from sliding further into the passageway 22 in the post, because the ends of the connector, which may extend on either side of the connection member, may be larger than the dimensions of the opening of the passageway. In addition, the connector prevents the connection member from sliding further into the cross-member 10, because the ends of the connector, which may extend on either side of the connection member, may be larger than the dimensions of the opening or cavity in the end 28 of the cross-member. Therefore, the connector effectively prevents movement of the connection member 8 relative to the post 4 and the cross-member 10 when the connector is placed laterally through the connection member at a position between the side of the post and one of the opposite ends 28 of a cross-member 10. One embodiment may include two connectors inserted laterally through the connection member at two positions outside the post, adjacent to opposite sides of the post, and between the sides of the post and the ends 28 of the cross-members 10, which is illustrated as two self-tapping screws 26 in FIG. 4b. Another embodiment may include the insertion of one connector laterally through the connection member at one position outside the post, adjacent to one side of the post, and between one side of the post and an end of a cross-member, which is illustrated as a single self-tapping screw 26 in FIGS. 4a and 4c.

In addition, it is preferred that the outer cross-sectional dimension, e.g. an outer diameter, of a cross-member is greater than the length of the connector passing laterally through the connection member, in order to prevent the ends of the connector, e.g. a self-tapping screw, from extending outside the periphery of the cross-members and from portions of the fence, in order to prevent causing injury to an animal or a human.

The animal containment fence may be configured to include a post which connects four or more cross-members, i.e. sections of the animal containment fence, in four different radial directions. In addition, the animal containment fence may be configured to include a post that forms a corner joining two sections of the animal containment fence or a tee joining three sections of the animal containment fence. A post may also be configured as an end of the animal containment fence. The animal containment fence may be configured in many ways, and there may be situations where an obstacle such as a wall, building, or other natural or man-made structure must be accommodated by the layout or configuration of the animal containment fence. FIGS. 4d, 4e, 4f, and 4g illustrate top views of a post 4 and illustrate one or more connection members 8 passing through the post in different embodiments that may be used to provide different layouts or configurations of the animal containment fence.

FIG. 4d illustrates a top view of a post where two connection members 8 pass through passageways in the post 4 at different height locations on the post with respect to the bottom and top ends of the post. The connection members 8 may form a cross or four-way connection to other sections of the animal containment fence. It should be noted that two or more connection members may be transversely coupled to a post at different height locations on the post by passing through passageways formed at different heights on the post. The angles between the two or more connection members, from the perspective of the top view of the post, may be angles of ninety degrees, substantially ninety degrees, more than ninety degrees, and/or less than ninety degrees. In FIG. 4d, the connection members 8 pass completely through the post 4, and each of the two ends of the connection members are telescopically engaged with one of the opposite ends of four cross-members 10. In addition, FIG. 4d illustrates the tops of two self-tapping screws 26, as connectors, passing through each of the connection members at a position between to the outside of the post 4 the end of the cross-member 10. It should also be noted that embodiment illustrated in FIG. 4d may be repeated by additional connection members and cross-members at additional locations along the height of the same post. In addition, the embodiment of the post, including the connection members and the cross-members, that is illustrated in FIG. 4d may be used in combination with other configurations of other connection members and cross-members at different heights on the same post.

FIG. 4e illustrates a top view of a post 4 having two connection members 8 inserted in the post 4 at the same height, or substantially the same height. In FIG. 4e, the post 4, connection members 8, and cross-members 10 form a corner of the animal containment fence. A first connection member of the two connection members 8 illustrated in FIG. 4e may extend across the inside of the post by passing through a passageway formed in the post. As illustrated in FIG. 4e, an end of the first connection member that is inserted in the post abuts or contacts the inner wall of the post at a position that is opposite from the position where the other end of the first connection member extends outside the post. A second connection member may be inserted into a passageway in the post 4 that is located at the same height or substantially the same height on the post as the passageway retaining the first connection member. The end of the second connection member that is inserted into the post may abut the side of the first connection member. It should be noted that the embodiment illustrated in FIG. 4e is not limited to forming a ninety degree angle between the longitudinal axes of the first and second connection members, and an angle of more and/or less than ninety degrees may be formed between the connection members inserted into the passageways in the post. Cross-members 10 may be telescopically engaged with the ends of the first and second connection members 8 that extend outside of the post 4. A screw may be disposed through the first connection member in a direction that is substantially orthogonal to the first connection member, and the screw may be disposed through the first connection member at position between the outside of the post and an end of a cross-member that is telescopically engaged with an end of the first connection member that extends from the side of the post. In addition, a screw may be disposed through the second connection member in a direction that is substantially orthogonal to the second connection member, and the screw may be disposed through the second connection member at position between the outside of the post and an end of a cross-member that is telescopically engaged with an end of the second connection member that extends from the side of the post. It should also be noted that the embodiment illustrated in FIG. 4e may be repeated by additional connection members and cross-members at additional locations along the height of the post. In addition, the embodiment of the post, including the connection members and the cross-members, that is illustrated in FIG. 4e may be used in combination with other configurations of other connection members and cross-members at different heights on the same post.

FIG. 4f illustrates a top view of a post wherein two connection members 8 are inserted into a post 4 and form a tee of the animal containment fence. As illustrated in FIG. 4f, a first connection member passes completely through a passageway in the post 4, ends of the first connection member extend from two sides of the post, and a second connection member is inserted at the same height, or substantially the same height as the first connection member on the post. An end of the second connection member, which is inserted into the post 4, abuts a side of the first connection member on the inside of the post. It should be noted the angles between longitudinal axes of the first and second connection members may be angles of ninety degrees, more than ninety degrees, or less than ninety degrees. In FIG. 4f, the ends of the connection members that extend outside the post are telescopically engaged with the cross-members 10. In addition, FIG. 4f illustrates the top of a self-tapping screw 26, as a connector, passing through the first connection member at a position between the outside of the post 4 and the end of a cross-member 10. In addition, another self-tapping screw may be disposed through the second connection member at a position between the outside of the post and an end of a cross-member that is telescopically engaged with an end of the second connection member that extends from a side of the post. It should also be noted that the embodiment illustrated in FIG. 4f may be repeated by additional connection members and cross-members at additional locations along the height of the post. In addition, the embodiment of the post, including the connection members and cross-members, that is illustrated in FIG. 4f may be used in combination with other configurations of other connection members and cross-members at different heights on the same post.

In FIG. 4g, a connection member 8 is inserted into one side of a post 4 of the animal containment fence, and one end of the connection member that is inserted in the post abuts an inner wall of the post. FIG. 4g illustrates that the other end of the connection member extends outside the post and is telescopically engaged with a cross-member 10. In addition, a screw may be disposed through the connection member in a direction that is substantially orthogonal to the connection member, and the screw may be disposed through the connection member at position between the outside of the post and an end of a cross-member that is telescopically engaged with an end of the connection member that extends from the side of the post. It should be noted that the embodiment illustrated in FIG. 4g may be repeated by additional connection members and cross-members at additional locations along the height of the post. In addition, the embodiment of the post, including the connection member and the cross-member, that is illustrated in FIG. 4g may be combined with other configurations of other connection members and cross-members at different heights on the same post.

In another embodiment of the animal containment fence, a connection member may be attached to a post in a manner where only one end of the connection member extends from a passageway that is formed in a post, and the other end of the connection member may be anchored within the passageway using, for example, a bolt or another type of fastener that passes laterally through both the post and the connection member and anchors the connection member, so that only one end of the connection member extends laterally from the post. In another embodiment the connection member may have a first end configured to extend laterally from a first hole opening of a passage formed in a post, and the other end of the same connection member may have an anchoring structure that anchors the connection member adjacent to a second hole opening of the same passage through the post, without extending laterally from the post, at least to the same extent that the first end of the connection member extends from the post. For example, the anchoring structure may be configured in the form of a flange formed on the second end of the connection member, so that the flange fits against the side the post at a position adjacent to the second hole and prevents the connection member from passing further through the passageway in the direction of the first hole. In another example, the anchoring structure may be configured as a bore hole formed transversely through the second end of the connection member, wherein the bore hole retains a cotter pin, screw, bolt, etc., outside the second hole opening of the passageway and prevents connection member from passing through the passageway in a direction of the first hole.

FIGS. 5a and 5b illustrate another embodiment of the animal containment fence where the connection members 30 are pipes fitted within passageways 36 that are formed transversely through the posts, and the ends 34 of the cross-members 32 fit within the ends of the connection members 30. FIG. 5a illustrates an embodiment including two posts 4, wherein each post may have three connection members 30 passing through three separate passageways 36 that are formed in the posts. The engagement between the ends of the connection members and the ends of the cross-members is telescopic and capable of reciprocating, which means that the end of the cross-member may slide in and out of the end of the connection member. In other words, the end of the cross-member floats inside the end of the connection member. FIG. 5b illustrates two self-tapping screws 26, as connectors, that pass through the connection member 30 at positions outside of the post 4 and adjacent to the side of the post. In the embodiment of the animal containment fence that is illustrated in FIG. 5b, it is preferred that two self-tapping screws are inserted through the connection member 30, so that the lengths of the cross-members 32 that fit within the ends of the connection members 30 on either side of the post 4 are the same or substantially the same. By maintaining the same or substantially the same length of the portion of the cross-members 32 that are inserted into the either side of the connection member 30, the release strength of the cross-members on either side of the post 4 may be the same or substantially similar.

FIG. 5c illustrates another embodiment that is similar to the embodiment illustrated in FIGS. 5a and 5b, to the extent that the posts 4 have connection members 30 passing through passageways 36 that are formed in the posts. However, the embodiment illustrated in FIG. 5c further illustrates two immobilizers, which may be screws 27, that are inserted into a hollow connection member 30 at positions adjacent to the outside of post 4. The ends of the immobilizers extend outside the hollow connection member 30, in order to prevent the hollow connection member from sliding in either direction through the passageway in the post. The embodiment illustrated in FIG. 5c also differs from the embodiment illustrated in FIGS. 5a and 5b, because FIG. 5c illustrates an interior member 31 disposed through the hollow connection member 30. Opposite ends of the interior member may extend from two opposite open ends of the hollow connection member 30. A connector, e.g. a self tapping screw 26, may pass through the interior member at a position adjacent to, and outside of, one of the two opposite open ends of the hollow connection member 30. Each of the ends of the interior member 31 may be telescopically engaged with one of the opposite ends of two cross-members 33, and the engagement is capable of reciprocating, which means that an end of the interior member 31 may slide in and out of an end of the cross-member 33. In other words, the ends of the interior member 31 float inside the ends of the cross-members 33. It is preferable that the length of the two ends of the interior member 31 that extend from either of the two opposite ends of the hollow connection member 30 are the same, in order to provide a symmetrical release strength for the flexible cross-members 33 that are telescopically engaged with the two ends of the interior member on either side of a post. The length of the two ends of an interior member that extend from the hollow connection member may be longer to increase the amount of force that may be required to release an end of a cross-member from an end of the interior member, and the length of the two ends of the interior member that extend from the hollow connection member may be shorter to decrease the amount of force that may be required to release the end of the cross-member from the end of the interior member.

Figure 6B:
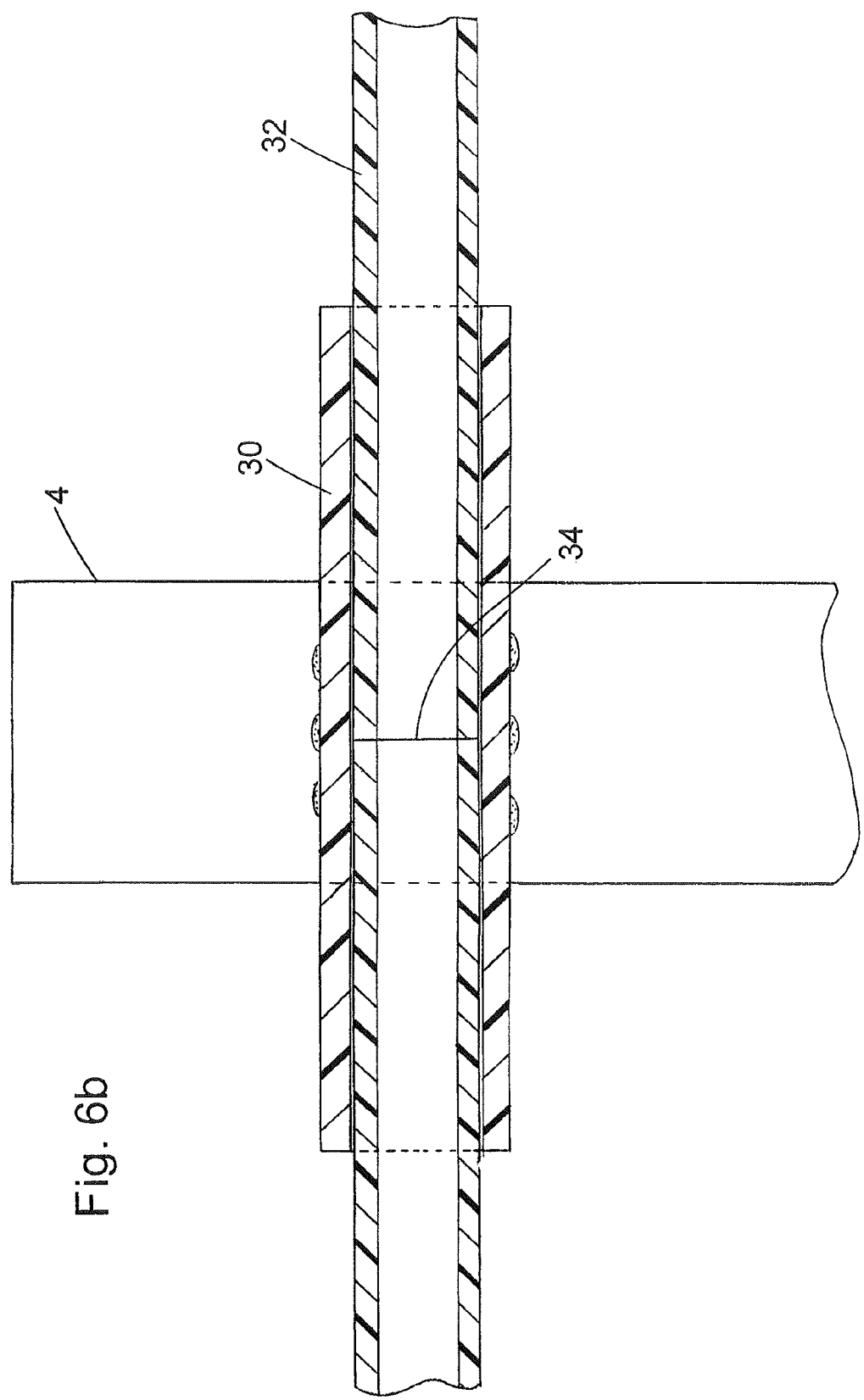
FIG. 6b is a side cross-sectional view of a top of a post of an embodiment of the animal containment fence.

FIGS. 6a and 6b illustrate another embodiment of the animal containment fence where the connection members 30 are pipes that are transversely coupled to the side of the posts. The connection members may be transversely coupled to the sides of the posts by means such as welding, molding, attachment using bolts or screws, etc. In FIGS. 6a and 6b, the connection members are transversely coupled to the side of a metal post by welding. In FIGS. 6a and 6b, the ends 34 of the cross-members 32 fit within the ends of the connection members 30. FIGS. 6a and 6b illustrate an embodiment where the ends 34 of adjacent cross-members 32 abut within the connection members 30. Since the ends of 34 the cross-members 32 may abut, a series of the cross-members 32 disposed between a series of the posts 4 of the animal containment fence are prevented from sliding out of the connection members, without application of an impact or force thereto by an animal or human, since there are substantially no gaps that allow lateral movement between the cross-members. However, it should be noted that the ends of the cross-members are not required to abut inside the connection members 30, and gaps may exist between the ends of the cross-members within the connection members. The engagement between the ends of the connection members and the ends of the cross-members is telescopic and capable of reciprocating, which means that the end of the cross-member may slide in and out of the end of the connection member, upon application of a force thereto from an animal or a human. In other words, the end of the cross-member floats inside the end of the connection member.

Figure 7B:
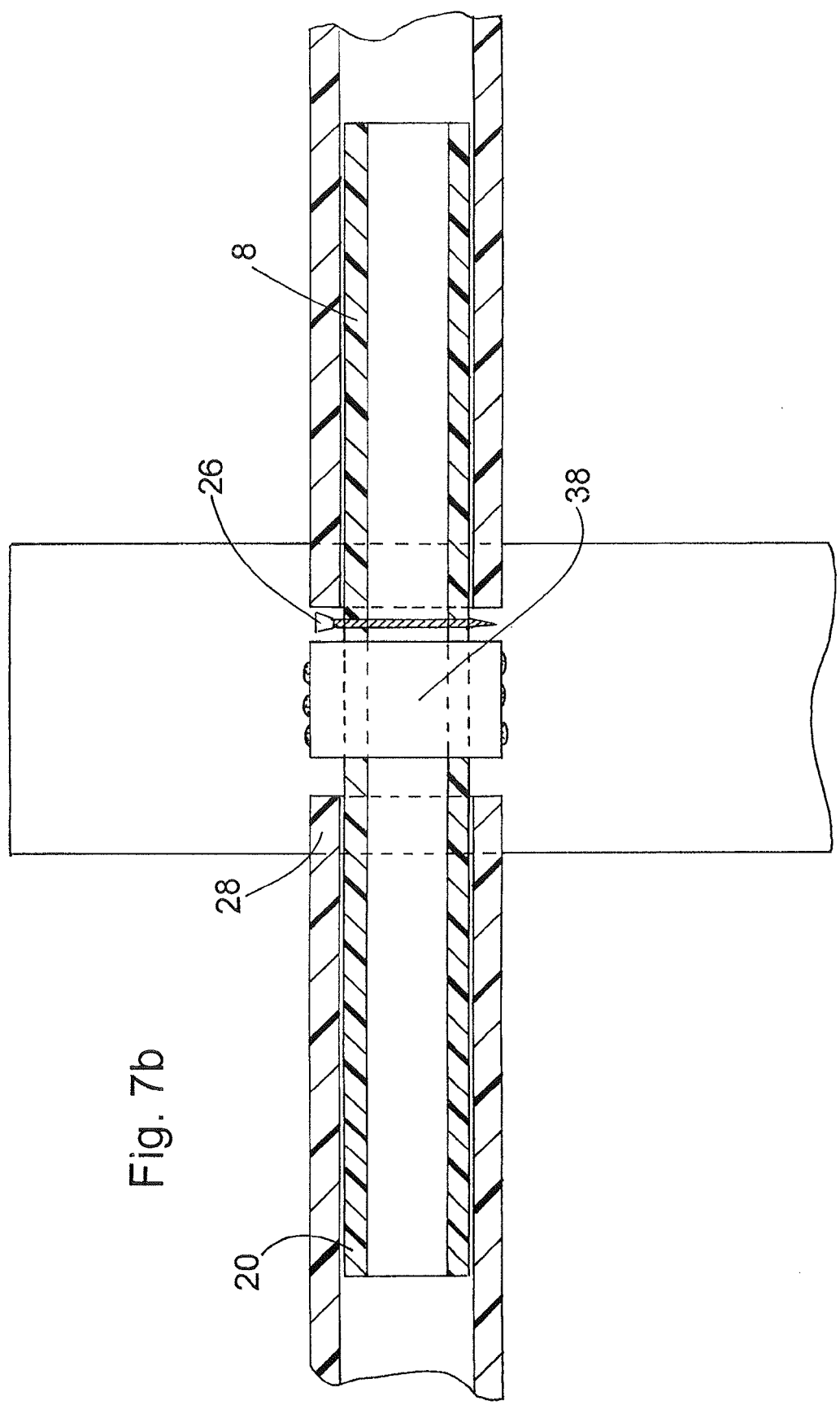
FIG. 7b is a side cross-sectional view of a top of a post of an embodiment of the animal containment fence.

FIGS. 7a and 7b illustrate an embodiment of the animal containment fence where the connection members 8 may be transversely coupled to the posts 4 by passing the connection members through collars 38 that are disposed on the sides of the posts. One or more collars 38 may be disposed on the side of a single post, and the collars have two openings that allow an oblong connection member 8 to pass through the collar in a direction that is transverse to the body or longitudinal axis of a post. In addition, a collar may be formed on the top of a post and allow the attachment of a connection member across the top of a post. The collars may be formed on the posts using welding, molding, forging, fastening, etc. The collars may receive connection members having the variety of constructions, sizes, and shapes, as described above.

In FIGS. 7a and 7b, an end 28 of a cross-member 10 fits over an end 20 of a connection member 8 extending laterally from a post. In other words, the end of a connection member fits within the hollow cavity of the end 28 of the cross-member 10. The engagement between the ends of the connection members and the ends of the cross-members is telescopic and capable of reciprocating, which means that the end of the connection member may slide in and out of the end of the cross-member. In other words, the end of the cross-member floats on the end of the connection member.

In addition, connectors, as described above, may be used to prevent the connection members from sliding out of the collars by placing a connector laterally through the connection member on one or both sides of the connection member at positions adjacent to collar. For example, FIG. 7b illustrates a connector as a self-tapping screw 26 that is disposed laterally through a connection member at a position adjacent to the collar 38. In another embodiment, connectors, as described above, may be placed through the body of the collar and through the connection member retained by the collar, in order prevent the connection member from sliding out of the collar.

In addition, the connection members may be transversely coupled to the posts by disposing a connection member transversely against the side of a post and fixing the connection member against the post, in order to retain the connection member against the side of the post. The connection member may be fixed against the side of the post by welding, bolts, screws, pins, etc.

It should also be noted that one or more connection members may be transversely coupled to a post as part of a post unit. For example, posts and connection members extending therefrom may be formed by a process, such as molding, forging, casting, welding etc., wherein the connection members and ends thereof extending laterally from the posts are formed as an integral and fixed part of each post. For example, in an embodiment where the post is made of metal, the connection members may be welded to the outside of the posts so that an end of each connection member extends laterally from the post.

FIGS. 3, 4a, 4b, 4c, 7a, and 7b illustrate embodiments where the cross-members 10 are hollow, and an end of a connection member 8 that is transversely coupled to a post 4 fits in the end 28 of the cross-member. In other words, an end 20 of a connection member 8 fits within one of the opposite ends 28 of a cross-member 10. The engagement between the end 20 of the connection member 8 with the end 28 of a cross-member 10 is telescopic and capable of reciprocating, because the end 20 of the connection member 8 fits inside the end 28 of the cross-member 10, and the end 20 of the connection member 8 floats or is capable telescopically sliding within the end 28 of the cross-member 10. It should be noted that the cross member may be a completely hollow pipe or a solid member having hollowed portions in each of the opposite ends for receiving an end of a connection member. In addition, the connection member may be solid or may be formed as a pipe having ends that are fitted inside the opposite ends of the cross-member.

FIG. 5c illustrates an embodiment where the cross-members 33 are hollow, and an end of an interior member 31 that is fitted within a hollow connection member 30 fits in the end of the cross-member. The engagement between an end of the interior member 31 and an end of a cross-member 33 is telescopic and capable of reciprocating, because the end of the interior member 31 fits inside the end of the cross-member 33, and the end of the interior member 31 may float or is capable telescopically sliding within the end of the cross-member 33. It should be noted that the cross-member may be a completely hollow pipe or a solid member having hollowed portions in each of the opposite ends for receiving an end of an interior member. In addition, the interior member may be solid or may be formed as a pipe having ends that are fitted inside the opposite ends of the cross-member.

In the embodiments illustrated in FIGS. 5*a*, 5*b*, 6*a*, and 6*b*, an end 34 of a cross-member 32 may be telescopically and reciprocally engaged with an end 40 of a connection member 30, such that the end 34 of the cross-member fits within a hollow cavity in the end 40 of the connection member 30. The engagement between the end 40 of the connection member 30 with the end 34 of the cross-member is telescopic and capable reciprocating, since the end 40 of the connection member 30 fits around the end 34 of the cross-member 32, and the end 34 of the cross-member 32 floats or is capable telescopically sliding within the end 40 of one of the connection members 30. In addition, it should be noted that when one end of a cross-member fits within one end of a connection member, the connection member may be a completely hollow pipe or a solid member having hollowed portions in each of the two ends for receiving the end of a cross-member. In addition, the cross-member may also be formed as a pipe having ends that fit within the hollow ends of the connection member.

In addition, it should be noted that each cross-member and each connection member are not limited to having a round cross-sectional shape and the cross-members and connection members may have other cross-sectional shapes, as long the engagement between the ends of the connection members with the ends of the cross-members is telescopic and capable of reciprocating, as noted above.

In addition, it is preferable that the cross-sectional dimensions of the cross-members and connection members, or the cross-members and interior members, that are telescopically engaged fit closely together. The close fit prevents disconnection between the cross-members and connection members, or disconnection between the cross-members and interior members, without the application of a force from an animal or a human.

In addition, the telescopic engagement between the end of the connection member and the end of the cross-member may be achieved regardless of whether the connection member is transversely coupled to a post by placing the connection member in a passageway through the post, placing the connection member in a collar disposed on the post, permanently forming a connection member as part of a post unit, or transversely coupling a connection member to the side of a post.

Each of the cross-members of the animal containment fence is flexible. The flexibility allows the cross-members to bend or flex, and telescopically reciprocate and/or release, upon the application of a force to a cross-member. The materials that may be used to construct the cross-members preferably include at least one polymeric material that has acceptable elastic properties. For example, polymeric materials that may be used in the construction of the cross-members may include polyvinylchloride, acrylonitrile butadiene styrene, polyether ether ketone, nylon, polypropylene, etc. In addition, each cross-member may be constructed from one or more polymeric materials, or a composite of polymeric materials and non-polymeric materials. The force that is applied to the cross-member may be caused by an animal and/or human colliding or impacting against the cross-member. Upon the application of the force to the cross member, the cross-member flexes, thereby shortening the distance between the ends of the cross-member, and the telescopic engagement between the end of the cross-member reciprocates or releases from the end of a connection member that is transversely coupled to a post. When the cross-member flexes, at least one of the opposite ends of the cross-member pulls away from the post and telescopically slides with respect to the connection member that is engaged with the end of the cross-member. Due to the elastic materials that are used in the cross-members, the cross-member may straighten or otherwise return to a relaxed position after an impact from an animal or human.

For example, FIG. 8*a* illustrates an embodiment where a cross-member 10 is disposed between two adjacent posts 4, and connection members 8 are transversely coupled to each post 4. One end 20 of each of the connection members is telescopically received in a hollow end or cavity in each of the opposite ends 28 of the cross-member 10. In FIG. 8*a*, the cross-member is relaxed and not flexed. FIG. 8*b* illustrates a scenario where a horse, or any other animal or a human, applies a force to the cross-member by impacting the cross member illustrated in FIG. 8*a*. Upon the impact from the horse, the cross-member flexes, the distance between the ends of the cross-member shortens, and the ends of the cross-member telescope away from the posts by sliding on the connection members that are disposed within the ends of the cross-member. In FIG. 8*b*, the horse applied a force to the cross-member, but the force was less than a release force, because, as illustrated in FIG. 8*c*, the flexible cross-member remains telescopically engaged with the connection members after the impact, and the cross-member returns to its relaxed and non-flexed state due to its elastic characteristics. Upon relaxation of the cross-member, as illustrated in FIG. 8*c*, the ends of the cross-member telescopically travel back toward the post by sliding on the connection members.

However, it is important to note that the hollow cavities of the ends of the cross-member may travel completely off the ends of the connection members and disengage from the connection members if a sufficient force is applied to the cross-member, causing the cross-member to flex in an amount sufficient to result in disengagement. For example, FIG. 9*a* illustrates an embodiment where a cross-member 10 is disposed in a relaxed state between two adjacent posts 4 and connection members 8 are transversely coupled to each post 4. One end 20 of each of the connection members is telescopically received in a hollow end or cavity in each of the opposite ends 28 of the cross-member 10. FIG. 9*b* illustrates a situation where a horse, or any other animal or human, applies a force to the cross-member illustrated in FIG. 9*a*. In FIG. 9*b*, the applied force causes the cross-member to flex and causes both of the opposite ends of the cross-member to slide on the ends of the connection members that are within the opposite ends of the cross-member. The distance between the opposite ends of the cross-member shortens, due to the flexion of the cross-member caused by the impact from the horse. It is important to note that the force applied by the horse to the cross-member in FIG. 9*b* is equal to or greater than a release force that is required to cause one of the opposite ends of the cross-member to disengage from an end of one of the connection members that is transversely coupled to one of the adjacent posts. In addition, FIG. 9*c* illustrates a situation where a horse applies a force equal to or greater than a release force that is sufficient to cause both of the opposite ends of the cross-member to slide off of the connection members, and the cross-member completely disengages from the connection members transversely coupled to either of the adjacent posts.

The animal containment fence, having the flexible cross-members telescopically engaged with the connection members, may allow the opposite ends of the flexible cross-member to release from the connection members when a force sufficient to cause such a release is applied to the cross-member. The amount of force required to cause the cross-member to release from the connection member may be increased by placing longer connection members in telescopic engagement with the cross-member, or the amount of force required to cause the cross-member to release may be decreased by placing shorter connection members in telescopic engagement with the cross-member. In addition, the amount of force required to cause the cross-member to release from the connection member may be increased by the use of a less flexible cross-member; and the amount force required to cause the cross-member to release from the connection member may be decreased by the use of more flexible cross-member.

It is important to note that that one or both of the opposite ends of a cross-member may telescopically reciprocate on, or release from, the ends of the connection members, upon application of a force to the cross-member, regardless of whether the force is applied by an animal or a human. In addition, it should be noted that the engagement between the ends of the connection members and the opposite ends of the cross-member may telescopically reciprocate or release upon application of a force, regardless of whether the ends of the connection members are received within the hollow cavities of the opposite ends of the cross-member, or whether the opposite ends of the cross-member are received in hollow cavities in the ends of the connection members.

In addition, regardless of the manner of telescopic engagement between the opposite ends of a cross-member with ends of two connection members that are transversely coupled to adjacent posts, when more than one cross-member is engaged with connection members that are transversely coupled between adjacent posts, an applied force may cause one or more of the cross members to reciprocate on the connection members, or the applied force may cause one or more of the cross-members to disengage from the connection members. In addition, one or more of the cross-members may disengage from connection members that are transversely coupled to adjacent posts, while one or more of the cross-members may reciprocate on the connection members or remain stationary.

An embodiment of a method of assembling the animal containment fence may include anchoring two or more posts to a surface so that top ends of the posts are disposed away from the surface, and bottom ends of the posts are disposed on, in, or toward the surface. Bottom ends of the posts may be driven into the ground, set in concrete, or set in sand, snow, gravel, etc. The posts may also be held upright using a frame that sits on the ground. Connection members are transversely coupled to the posts. The connection members may be transversely coupled to a post by passing the connection member through a passageway that is formed transversely through a post. However, the method is not limited to passing the connection member through a passageway in the post. For example, a connection member may be transversely coupled to a post by passing the connection member through a collar on the side or the top of the post; or by welding, screwing, molding, forging, etc. a connection member to the post. For example, a connection member may be hollow or solid and may be welded, screwed, molded or forged to the side of a post in a transverse configuration.

An embodiment of the method may include telescopically and reciprocally engaging a cavity in the end of the cross-member with an end of a connection member that is transversely coupled to a post by placing an end of the connection member in the cavity of the cross-member. Another embodiment of the method may include telescopically and reciprocally engaging a cavity in the end of a connection member that is transversely coupled to a post with an end of a cross-member by placing an end of the cross-member in the cavity of the connection member. In either embodiment, the other end of the cross-member may then be aligned with an adjacent post. Another connection member may be transversely coupled to the adjacent post and the connection member may be telescopically and reciprocally engaged with the end of the cross-member that is aligned with the adjacent post.

The method steps may be repeated numerous times to anchor many posts to a surface or surfaces, to transversely couple the connection members with the posts, and to place one or more cross-members between adjacent posts. Repeating the steps above serves to assemble a fence having the desired number of posts and the desired number of cross-members between the posts.

In another embodiment, the method of assembling the animal containment fence may include a step of anchoring at least two posts to a surface. Smaller diameter pipes may be used as connection members. Another step may include passing a first smaller diameter pipe through a transverse passage formed in a first post. A larger diameter pipe may be used as a cross-member, and another step may include telescopically and reciprocally engaging a cavity formed in a first end of the larger diameter pipe around one end of the first smaller diameter pipe that extends laterally from one side of the first post. Another step may include aligning a cavity formed in a second end of the of the larger diameter pipe with an opening of a transverse passage formed in a second post of the at least two posts. Another step may include passing a second smaller diameter pipe through the transverse passage formed in the second post so that the cavity of the second end of the larger diameter pipe is telescopically and reciprocally engaged around one end of the second smaller diameter pipe. The method steps may be repeated numerous times to anchor many posts to a surface or surfaces and to place one or more larger diameter pipes between adjacent posts. Larger diameter pipes may be connected between pairs of adjacent posts by being telescopically and reciprocally engaged with smaller diameter pipes that are transversely coupled to adjacent posts.

The method may also include a step of inserting a connector laterally through the first smaller diameter pipe at a location on the first smaller diameter pipe where the smaller diameter pipe extends laterally from one side of the first post. The connector may be inserted in the first smaller diameter pipe before or after telescopically and reciprocally engaging the cavity of the first end of the larger diameter pipe around the end of the first smaller diameter pipe. The method may also include a step driving a self-tapping screw through the first smaller diameter pipe.

The exemplary embodiments shown in the figures and described above illustrate but do not limit the subject matter disclosed in this specification. It should be understood that there is no intention to limit the subject matter in this specification to the specific form disclosed; rather, the disclosed subject matter is to cover all modifications, alternative constructions, and equivalents falling within the spirit and scope of the subject matter recited in the claims.

What is claimed is:

1. An animal containment fence for containing an animal upon an impact from the animal when the impact applies less force than a release force for preventing injury to the animal upon impacting the fence, the fence comprising:
   at least two posts, each post of the at least two posts comprising a bottom end for anchoring to a surface and top end for projecting away from the surface,
   at least two passageways, each passageway of the at least two passageways being formed transversely through a respective post of the at least two posts;
   at least two connection members, each connection member of the at least two connection members comprising an oblong shape and two ends, and each connection member of the at least two connection members being disposed through a respective passageway of the at least two passageways;
at least two connectors, each connector of the at least two connectors passing laterally through a respective connection member of the at least two connection members at positions outside the at least two posts; and
at least one flexible cross-member, each flexible cross-member of the at least one flexible cross-member being constructed from at least one polymeric material, the at least one flexible cross-member comprising opposite ends, each of the opposite ends comprising a telescopic engagement with one end of the two ends of two connection members of the at least two connection members disposed through two respective passageways of the at least two passageways formed transversely through adjacent posts of the at least two posts to permit telescopic movement between the at least one cross-member and the at least two connection members, the telescopic engagement being configured to move reciprocally upon a flexion of the at least one flexible cross-member caused by an applied force less than a release force and to release upon a flexion of the at least one flexible cross-member caused by an applied force equal to or greater than the release force,
wherein the at least one flexible cross-member is not disposed in the at least two passageways, the at least two connectors do not pass through the at least one flexible cross-member, lengths of the at least two connectors are less than an outer diameter of the at least one flexible cross-member, and the lengths of the at least two connectors are greater than diameters of the at least two passageways.

2. The animal containment fence of claim 1, wherein each flexible cross-member of the at least one flexible cross-member is a pipe, and the opposite ends thereof each comprise an inner cavity receiving, in the telescopic engagement, the one end of the two ends of the two connection members disposed through the two respective passageways of the at least two passageways formed transversely through the adjacent posts.

3. The animal containment fence of claim 2, wherein each connection member of the at least two connection members is a pipe comprising an outer diameter fitting within the inner cavity of the opposite ends of the at least one flexible cross-member.

4. The animal containment fence of claim 2, wherein the release force is a force sufficient to cause at least one of the opposite ends of the at least one flexible cross-member to release from one of the at least two connection members.

5. The animal containment fence of claim 4, wherein the release force is proportional to a length of the at least two connection members.

6. The animal containment fence of claim 1, wherein the at least two connection members are constructed from at least one polymeric material and the at least two connectors are self-tapping screws.

7. The animal containment fence of claim 1, further comprising a ball fixed to the top end of at least one post of the at least two posts, a largest dimension of a radial cross section of the ball being substantially equal to or greater than a largest dimension of a radial cross section of the at least one post.

8. The animal containment fence according to claim 1, wherein the two ends of each connection member of the at least two connection members comprise outer diameters configured to conform to inner diameters of the opposite ends of the at least one flexible cross-member.

9. An animal containment fence for containing an animal upon an impact from the animal when the impact applies less force than a release force for preventing injury to the animal upon impacting the fence, the fence comprising:
at least two posts, each post of the at least two posts comprising a bottom end for anchoring to a surface and a top end of each post of the at least two posts for being disposed away from the surface;
at least two passageways, each passageway of the at least two passageways being transversely formed through a respective post of the at least two posts;
at least two smaller diameter pipes, each smaller diameter pipe of the at least two smaller diameter pipes comprising two ends, each smaller diameter pipe of the at least two smaller diameter pipes being disposed in a respective passageway of the least two passageways, and at least one end of the two ends of each smaller diameter pipe of the at least two smaller diameter pipes extending laterally from the at least two posts;
at least two connectors, each connector of the at least two connectors passing laterally through a respective smaller diameter pipe of the at least two smaller diameter pipes at positions outside the at least two posts; and
at least one larger diameter flexible pipe constructed of at least one polymeric material, the at least one larger diameter flexible pipe comprising opposite ends, each of the opposite ends comprising a telescopic engagement around one end of the two ends of two smaller diameter pipes of the at least two smaller diameter pipes disposed in two respective passageways of the at least two passageways formed through adjacent posts of the at least two posts to permit telescopic movement between the at least one larger diameter flexible pipe and the at least two smaller diameter pipes, the telescopic engagement being configured to move reciprocally upon a flexion of the at least one larger diameter flexible pipe caused by a force less than a release force applied to the at least one larger diameter flexible pipe, and the telescopic engagement being configured to release upon a flexion of the at least one larger diameter flexible pipe caused by a force equal to or greater than a release force applied to the larger diameter flexible pipe,
wherein the at least one larger diameter flexible pipe is not disposed in the at least two passageways, the at least two connectors do not pass through the at least one larger diameter flexible pipe, lengths of the at least two connectors are less than an outer diameter of the at least one larger diameter flexible pipe, and the lengths of the at least two connectors are greater than diameters of the at least two passageways.

10. The animal containment fence of claim 9, wherein the at least two smaller diameter pipes are constructed from at least one polymeric material and the at least two connectors are self-tapping screws.

11. The animal containment fence of claim 9, further comprising a ball fixed to the top end of at least one post of the at least two posts, a largest dimension of a radial cross section of the ball being substantially equal to or greater than a largest dimension of a radial cross section of the at least one post.

12. The animal containment fence of claim 9, wherein two or more smaller diameter pipes of the at least two smaller diameter pipes are disposed in separate passageways of the at least two passageways formed in one post of the at least two posts, the separate passageways being at different heights between the top end and the bottom end of the one post, and the separate passageways being transversely formed through the one post in different radial directions.

13. The animal containment fence of claim 9, wherein a first smaller diameter pipe and a second smaller diameter pipe of the at least two smaller diameter pipes are disposed in separate passageways of the at least two passageways formed in one post of the at least two posts, the separate passageways being at substantially the same height between the top end and the bottom end of the one post, the separate passageways being formed through the one post in different radial directions, and a first end of the two ends of the second smaller diameter pipe abutting a side of the first smaller diameter pipe at a position inside the one post.

14. The animal containment fence of claim 13, wherein the two ends of the first smaller diameter pipe and a second end of the second smaller diameter pipe extend from sides of the one post, and the two ends of the first smaller diameter pipe and the second end of the second smaller diameter pipe are each in telescopic engagement with one of the opposite ends of separate larger diameter flexible pipes of the at least one larger diameter flexible pipe.

15. The animal containment fence according to claim 9, wherein the two ends of each smaller diameter pipe of the at least two smaller diameter pipes comprise outer diameters configured to conform to inner diameters of the opposite ends of the at least one larger diameter flexible pipe.

* * * * *